(12) United States Patent
Ziraknejad et al.

(10) Patent No.: US 12,164,857 B2
(45) Date of Patent: Dec. 10, 2024

(54) GENERATING AND PRESENTING CUSTOMIZED INFORMATION CARDS

(71) Applicant: MicroStrategy Incorporated, Vienna, VA (US)

(72) Inventors: Siamak Ziraknejad, Reston, VA (US); Jiao Xu, Oakton, VA (US); Boyu Li, Herndon, VA (US); Quan Jia, Oakton, VA (US); Saurabh Abhyankar, McLean, VA (US); Timothy Lang, McLean, VA (US)

(73) Assignee: MicroStrategy Incorporated, Vienna, VA (US)

( * ) Notice: Subject to any disclaimer, the term of this patent is extended or adjusted under 35 U.S.C. 154(b) by 17 days.

(21) Appl. No.: 17/587,810

(22) Filed: Jan. 28, 2022

(65) Prior Publication Data

US 2022/0222418 A1   Jul. 14, 2022

Related U.S. Application Data

(63) Continuation of application No. 16/730,417, filed on Dec. 30, 2019, now Pat. No. 11,238,210, which is a
(Continued)

(51) Int. Cl.
G06F 40/106 (2020.01)
G06F 16/9032 (2019.01)
(Continued)

(52) U.S. Cl.
CPC ...... *G06F 40/106* (2020.01); *G06F 16/90328* (2019.01); *G06F 16/9038* (2019.01);
(Continued)

(58) Field of Classification Search
CPC ............. G06F 40/106; G06F 16/90328; G06F 16/9038; G06F 21/31; G06F 2221/2141;
(Continued)

(56) References Cited

U.S. PATENT DOCUMENTS 6,006,242 A   12/1999 Poole et al.
6,209,005 B1   3/2001 Harker et al.
(Continued)

FOREIGN PATENT DOCUMENTS

GB   2354851   4/2001

OTHER PUBLICATIONS

Notice of Allowance in U.S. Appl. No. 16/247,892, dated Mar. 3, 2022, 6 pages.
(Continued)

*Primary Examiner* — Ryan F Pitaro
(74) *Attorney, Agent, or Firm* — Fish & Richardson P.C.

(57) ABSTRACT

Methods, systems, apparatus, and computer-readable media for generating and presenting customized information cards. In some implementations, an indication of a data set is received. Data indicating a selection of an element of the data set is received. An indication of items in the data set that are associated with the selected element is received. Data is received indicating a selection of one or more of the items that are associated with the selected element of the data set. Card data defining an information card for the selected element of the data set is stored. The card definition data can indicate the selected one or more items and a reference to the data set.

20 Claims, 14 Drawing Sheets

Related U.S. Application Data continuation-in-part of application No. 16/247,892, filed on Jan. 15, 2019, now Pat. No. 11,500,655, and a continuation-in-part of application No. 16/248,659, filed on Jan. 15, 2019, now Pat. No. 11,815,936.

(60) Provisional application No. 62/810,498, filed on Feb. 26, 2019, provisional application No. 62/802,047, filed on Feb. 6, 2019, provisional application No. 62/720,955, filed on Aug. 22, 2018.

(51) Int. Cl.
*G06F 16/9038* (2019.01)
*G06F 21/31* (2013.01)
*G06N 20/00* (2019.01)

(52) U.S. Cl.
CPC ............ *G06F 21/31* (2013.01); *G06N 20/00* (2019.01); *G06F 2221/2141* (2013.01)

(58) Field of Classification Search
CPC .. G06F 40/186; G06F 16/904; G06F 21/6218; G06N 20/00; G06Q 10/10
See application file for complete search history.

(56) References Cited

U.S. PATENT DOCUMENTS

| | | |
|---|---|---|
| 6,584,479 B2 | 6/2003 | Chang et al. |
| 7,130,841 B1 | 10/2006 | Goel et al. |
| 7,630,965 B1 | 12/2009 | Erickson et al. |
| 7,640,511 B1 | 12/2009 | Keel et al. |
| 7,673,282 B2 | 3/2010 | Amaru et al. |
| 7,747,648 B1 | 6/2010 | Kraft et al. |
| 7,827,527 B1 | 11/2010 | Chiluvuri |
| 8,041,711 B2 | 10/2011 | Walker et al. |
| 8,413,045 B2 | 4/2013 | Lemonik et al. |
| 8,539,336 B2 | 9/2013 | Griffiths et al. |
| 8,745,718 B1 | 6/2014 | Dufel et al. |
| 8,761,463 B2 | 6/2014 | Cheswick |
| 8,782,552 B2 | 7/2014 | Batman et al. |
| 8,898,595 B2 | 11/2014 | Cragun et al. |
| 9,070,182 B1 | 6/2015 | Chua et al. |
| 9,165,406 B1 | 10/2015 | Gray et al. |
| 9,385,873 B2 | 7/2016 | Kupinsky et al. |
| 9,412,208 B2 | 8/2016 | Greenberg et al. |
| 9,582,154 B2 | 2/2017 | Greenberg et al. |
| 9,582,913 B1 | 2/2017 | Kraft et al. |
| 9,710,123 B1 | 7/2017 | Gray |
| 9,760,645 B1 | 9/2017 | Park |
| 10,051,107 B1 | 8/2018 | Prasad et al. |
| 10,078,867 B1 | 9/2018 | Chan et al. |
| 10,122,763 B2 | 11/2018 | Lawson et al. |
| 10,165,015 B2 | 12/2018 | Lawson et al. |
| 10,169,427 B2 | 1/2019 | Aaron et al. |
| 10,200,236 B1 | 2/2019 | Lewis et al. |
| 10,230,772 B2 | 3/2019 | Lawson et al. |
| 10,261,589 B2 | 4/2019 | Sakai |
| 10,318,995 B2 | 6/2019 | King et al. |
| 10,503,821 B2 | 12/2019 | Brunswig et al. |
| 10,554,590 B2 | 2/2020 | Cabrera-Cordon et al. |
| 10,560,495 B2 | 2/2020 | Lawson et al. |
| 10,691,314 B1 | 6/2020 | Freeman et al. |
| 10,762,903 B1* | 9/2020 | Kahan .................. G10L 15/26 |
| 10,848,482 B1 | 11/2020 | Eisen et al. |
| 10,885,099 B1 | 1/2021 | Price et al. |
| 10,902,344 B1 | 2/2021 | Kenthapadi et al. |
| 10,915,455 B2 | 2/2021 | Jayaraman et al. |
| 10,979,409 B2 | 4/2021 | Lu et al. |
| 11,003,323 B1 | 4/2021 | Fan et al. |
| 11,019,191 B1 | 5/2021 | Gorsica, IV et al. |
| 11,048,768 B1 | 6/2021 | Kolbert et al. |
| 11,120,057 B1 | 9/2021 | McNabney et al. |
| 11,120,218 B2 | 9/2021 | Ray et al. |
| 11,138,518 B1 | 10/2021 | Yu et al. |
| 11,176,139 B2 | 11/2021 | Li et al. |
| 11,194,717 B2 | 12/2021 | Soini et al. |
| 11,238,210 B2 | 2/2022 | Ziraknejad et al. |
| 11,288,637 B2 | 3/2022 | Pena et al. |
| 11,460,976 B2 | 10/2022 | Fan et al. |
| 11,494,372 B2 | 11/2022 | Rigney et al. |
| 11,500,655 B2 | 11/2022 | Ziraknejad et al. |
| 11,501,016 B1 | 11/2022 | Peterson et al. |
| 11,501,736 B2 | 11/2022 | Notani et al. |
| 11,561,968 B2 | 1/2023 | Nocedal et al. |
| 11,562,044 B1 | 1/2023 | Du et al. |
| 11,682,390 B2 | 6/2023 | Temkin et al. |
| 11,687,606 B2 | 6/2023 | Shah et al. |
| 11,714,955 B2 | 8/2023 | Nocedal et al. |
| 11,815,936 B2 | 11/2023 | Roy et al. |
| 11,841,915 B2 | 12/2023 | Fan et al. |
| 12,032,644 B2 | 7/2024 | Imtiaz et al. |
| 2002/0002707 A1 | 1/2002 | Ekel et al. |
| 2002/0052861 A1 | 5/2002 | Gustman |
| 2002/0160805 A1 | 10/2002 | Laitinen et al. |
| 2004/0080532 A1 | 4/2004 | Cragun et al. |
| 2004/0093349 A1 | 5/2004 | Buinevicius et al. |
| 2004/0168171 A1 | 8/2004 | Comparato et al. |
| 2004/0172616 A1 | 9/2004 | Rothschiller et al. |
| 2004/0230447 A1 | 11/2004 | Schwerin-Wenzel et al. |
| 2004/0249659 A1 | 12/2004 | Schwerin-Wenzel et al. |
| 2005/0041863 A1 | 2/2005 | Ray et al. |
| 2005/0262555 A1 | 11/2005 | Waterland |
| 2006/0047646 A1 | 3/2006 | Maluf et al. |
| 2006/0065707 A1 | 3/2006 | Kanatani et al. |
| 2006/0106599 A1 | 5/2006 | Horvitz |
| 2006/0184425 A1 | 8/2006 | Hanechak et al. |
| 2006/0293904 A1 | 12/2006 | Ramanathan et al. |
| 2007/0040813 A1 | 2/2007 | Kushler et al. |
| 2007/0057037 A1 | 3/2007 | Woronec |
| 2007/0143544 A1 | 6/2007 | Lin et al. |
| 2007/0157076 A1 | 7/2007 | Lin et al. |
| 2007/0174350 A1 | 7/2007 | Pell et al. |
| 2007/0174761 A1 | 7/2007 | Lin et al. |
| 2007/0180377 A1 | 8/2007 | Gittelman et al. |
| 2007/0271376 A1 | 11/2007 | Yach |
| 2007/0280179 A1 | 12/2007 | Van Belle et al. |
| 2008/0005659 A1 | 1/2008 | Fujimaki |
| 2008/0021860 A1 | 1/2008 | Wiegering et al. |
| 2008/0031203 A1 | 2/2008 | Bill |
| 2008/0086455 A1 | 4/2008 | Meisels et al. |
| 2008/0086700 A1 | 4/2008 | Rodriguez et al. |
| 2008/0104052 A1 | 5/2008 | Ryan et al. |
| 2008/0104501 A1* | 5/2008 | Sattler .................. G06F 40/186 715/224 |
| 2008/0195659 A1 | 8/2008 | Rawle |
| 2008/0209329 A1 | 8/2008 | DeFranco et al. |
| 2008/0243834 A1 | 10/2008 | Rieman et al. |
| 2008/0258881 A1 | 10/2008 | Manson et al. |
| 2008/0294624 A1 | 11/2008 | Kanigsberg et al. |
| 2009/0018996 A1 | 1/2009 | Hunt et al. |
| 2009/0100323 A1 | 4/2009 | Walls et al. |
| 2009/0158200 A1 | 6/2009 | Palahnuk et al. |
| 2009/0164502 A1 | 6/2009 | Dasgupta et al. |
| 2009/0164564 A1 | 6/2009 | Willis |
| 2009/0221268 A1 | 9/2009 | Yach |
| 2009/0228918 A1 | 9/2009 | Rolff et al. |
| 2009/0259927 A1* | 10/2009 | Fisher ................ G06Q 30/0277 715/205 |
| 2009/0315848 A1 | 12/2009 | Ku et al. |
| 2010/0017478 A1 | 1/2010 | Mejia et al. |
| 2010/0095240 A1 | 4/2010 | Shiplacoff et al. |
| 2010/0138271 A1 | 6/2010 | Henkin et al. |
| 2010/0174998 A1 | 7/2010 | Lazarus et al. |
| 2010/0176194 A1 | 7/2010 | Hodgkinson et al. |
| 2010/0228624 A1 | 9/2010 | Morris et al. |
| 2010/0255778 A1 | 10/2010 | Lovell et al. |
| 2010/0278453 A1 | 11/2010 | King |
| 2011/0026778 A1 | 2/2011 | Ye |
| 2011/0026838 A1 | 2/2011 | King et al. |
| 2011/0033036 A1 | 2/2011 | Edwards et al. |
| 2011/0055250 A1* | 3/2011 | Nandy .................. G06F 16/248 715/810 |
| 2011/0119165 A1 | 5/2011 | Zee |

(56) References Cited

U.S. PATENT DOCUMENTS

| | | |
|---|---|---|
| 2011/0185437 A1 | 7/2011 | Tran et al. |
| 2011/0196851 A1 | 8/2011 | Vadlamani et al. |
| 2011/0246880 A1 | 10/2011 | Horton et al. |
| 2011/0258529 A1* | 10/2011 | Doig ................. G06Q 30/0241 726/22 |
| 2012/0054211 A1 | 3/2012 | Arsenault et al. |
| 2012/0072280 A1* | 3/2012 | Lin .................... G06Q 30/0246 705/14.45 |
| 2012/0084340 A1 | 4/2012 | McCormack et al. |
| 2012/0131451 A1 | 5/2012 | Abe |
| 2012/0144286 A1 | 6/2012 | Bank et al. |
| 2012/0203753 A1 | 8/2012 | Biran et al. |
| 2012/0212337 A1 | 8/2012 | Montyne et al. |
| 2012/0233256 A1 | 9/2012 | Shaham et al. |
| 2012/0254369 A1 | 10/2012 | Gillard et al. |
| 2012/0265736 A1 | 10/2012 | Williams et al. |
| 2012/0265779 A1 | 10/2012 | Hsu et al. |
| 2012/0278164 A1 | 11/2012 | Spivack |
| 2012/0278305 A1 | 11/2012 | Wei et al. |
| 2013/0031453 A1 | 1/2013 | Griffiths et al. |
| 2013/0031454 A1 | 1/2013 | Griffiths et al. |
| 2013/0031457 A1 | 1/2013 | Griffiths et al. |
| 2013/0046544 A1 | 2/2013 | Kay et al. |
| 2013/0054617 A1 | 2/2013 | Colman |
| 2013/0117287 A1 | 5/2013 | Jagota et al. |
| 2013/0117653 A1 | 5/2013 | Sukhanov et al. |
| 2013/0159848 A1 | 6/2013 | Banke et al. |
| 2013/0179209 A1 | 7/2013 | Milosevich |
| 2013/0254739 A1 | 9/2013 | Chen et al. |
| 2013/0275120 A1 | 10/2013 | DeGross |
| 2013/0283194 A1 | 10/2013 | Kopp et al. |
| 2013/0297308 A1 | 11/2013 | Koo et al. |
| 2013/0325839 A1 | 12/2013 | Goddard et al. |
| 2013/0332962 A1 | 12/2013 | Moritz et al. |
| 2013/0344468 A1 | 12/2013 | Lindsay et al. |
| 2014/0046976 A1 | 2/2014 | Zhang et al. |
| 2014/0115070 A1 | 4/2014 | Virtanen et al. |
| 2014/0115456 A1 | 4/2014 | White et al. |
| 2014/0122289 A1* | 5/2014 | Beck ................. G06Q 30/0621 705/26.5 |
| 2014/0143202 A1 | 5/2014 | Rekula et al. |
| 2014/0143737 A1 | 5/2014 | Mistry et al. |
| 2014/0149896 A1 | 5/2014 | Los et al. |
| 2014/0172418 A1 | 6/2014 | Puppin |
| 2014/0172870 A1 | 6/2014 | Wang et al. |
| 2014/0173501 A1 | 6/2014 | Wu |
| 2014/0177819 A1* | 6/2014 | Vymenets ........... H04M 3/5175 379/265.09 |
| 2014/0180672 A1 | 6/2014 | Mo et al. |
| 2014/0218385 A1 | 8/2014 | Carmi |
| 2014/0229462 A1* | 8/2014 | Lo ........................ G06F 16/951 707/707 |
| 2014/0236978 A1 | 8/2014 | King et al. |
| 2014/0259184 A1 | 9/2014 | Hoyer |
| 2014/0278349 A1 | 9/2014 | Grieves et al. |
| 2014/0304103 A1 | 10/2014 | Barton et al. |
| 2014/0304365 A1 | 10/2014 | Khanna |
| 2014/0310595 A1 | 10/2014 | Acharya et al. |
| 2014/0334721 A1 | 11/2014 | Cervin et al. |
| 2014/0365395 A1 | 12/2014 | Arguelles et al. |
| 2014/0365944 A1 | 12/2014 | Moore et al. |
| 2015/0006564 A1 | 1/2015 | Tomkins et al. |
| 2015/0012279 A1 | 1/2015 | Kim et al. |
| 2015/0019221 A1 | 1/2015 | Lee et al. |
| 2015/0033141 A1 | 1/2015 | Mishra |
| 2015/0033149 A1 | 1/2015 | Kuchoor |
| 2015/0046834 A1 | 2/2015 | Wu et al. |
| 2015/0074138 A1 | 3/2015 | Nam et al. |
| 2015/0082219 A1* | 3/2015 | Beck ................. G06Q 10/0639 715/771 |
| 2015/0085146 A1 | 3/2015 | Khemkar |
| 2015/0160806 A1 | 6/2015 | Fey et al. |
| 2015/0163206 A1 | 6/2015 | McCarthy et al. |
| 2015/0180875 A1 | 6/2015 | Kay |
| 2015/0189347 A1 | 7/2015 | Oztaskent et al. |
| 2015/0213074 A1 | 7/2015 | Varakin et al. |
| 2015/0278534 A1 | 10/2015 | Thiyagarajan et al. |
| 2015/0356085 A1* | 12/2015 | Panda ....................... G06N 5/04 707/748 |
| 2016/0044132 A1 | 2/2016 | Croft |
| 2016/0048698 A1 | 2/2016 | Sahu et al. |
| 2016/0070686 A1 | 3/2016 | Yu et al. |
| 2016/0103883 A1* | 4/2016 | Ramani ............. G06F 16/24573 707/725 |
| 2016/0104200 A1 | 4/2016 | Osotio et al. |
| 2016/0117593 A1 | 4/2016 | London |
| 2016/0117782 A1 | 4/2016 | Stibel et al. |
| 2016/0124924 A1 | 5/2016 | Greenberg et al. |
| 2016/0124928 A1 | 5/2016 | Fink et al. |
| 2016/0132970 A1 | 5/2016 | Greenberg et al. |
| 2016/0140109 A1 | 5/2016 | Kim et al. |
| 2016/0140649 A1 | 5/2016 | Kleve et al. |
| 2016/0162140 A1* | 6/2016 | Nasson .................... H04L 67/02 715/738 |
| 2016/0170981 A1 | 6/2016 | Morimoto et al. |
| 2016/0188719 A1 | 6/2016 | Glover et al. |
| 2016/0210734 A1 | 7/2016 | Kass et al. |
| 2016/0261658 A1 | 9/2016 | Taylor et al. |
| 2016/0267523 A1* | 9/2016 | Biswas .............. G06Q 30/0201 |
| 2016/0294755 A1 | 10/2016 | Prabhu |
| 2016/0352891 A1 | 12/2016 | Niu et al. |
| 2016/0379117 A1 | 12/2016 | Faaborg |
| 2017/0046180 A1 | 2/2017 | Desineni et al. |
| 2017/0076321 A1 | 3/2017 | Reznek et al. |
| 2017/0097926 A1* | 4/2017 | Ben-Tzur ............ H04L 67/1097 |
| 2017/0104957 A1 | 4/2017 | Farrell |
| 2017/0109334 A1 | 4/2017 | Anglin et al. |
| 2017/0140755 A1* | 5/2017 | Andreas .................. G06F 40/35 |
| 2017/0178144 A1 | 6/2017 | Follet et al. |
| 2017/0185686 A1 | 6/2017 | Levi et al. |
| 2017/0188213 A1* | 6/2017 | Nirantar ............... H04L 67/564 |
| 2017/0212910 A1 | 7/2017 | Morris et al. |
| 2017/0214674 A1* | 7/2017 | Bakshi ............... G06F 16/9574 |
| 2017/0243132 A1* | 8/2017 | Sainani ................... H04L 41/20 |
| 2017/0308291 A1 | 10/2017 | Luipold |
| 2017/0315711 A1 | 11/2017 | Adams |
| 2017/0329466 A1 | 11/2017 | Krenkler et al. |
| 2017/0330195 A1 | 11/2017 | Lange et al. |
| 2017/0361233 A1 | 12/2017 | Stirling et al. |
| 2017/0366579 A1* | 12/2017 | Assuncao Aguiar ... G06T 11/60 |
| 2018/0020076 A1 | 1/2018 | Porwal |
| 2018/0060302 A1 | 3/2018 | Liang et al. |
| 2018/0092547 A1 | 4/2018 | Tzvieli et al. |
| 2018/0113865 A1 | 4/2018 | Najork et al. |
| 2018/0121503 A1 | 5/2018 | Bakke et al. |
| 2018/0129941 A1 | 5/2018 | Gustafson et al. |
| 2018/0190274 A1 | 7/2018 | Kirazci et al. |
| 2018/0218042 A1 | 8/2018 | Krishnan et al. |
| 2018/0225341 A1* | 8/2018 | Merg .................... G06F 16/285 |
| 2018/0253163 A1 | 9/2018 | Berger et al. |
| 2018/0318719 A1 | 11/2018 | Ma et al. |
| 2018/0329878 A1 | 11/2018 | Hirzel et al. |
| 2018/0336641 A1 | 11/2018 | Dziabiak et al. |
| 2018/0337967 A1 | 11/2018 | Ritchie et al. |
| 2018/0350144 A1 | 12/2018 | Rathod |
| 2019/0005025 A1 | 1/2019 | Malabarba |
| 2019/0035403 A1 | 1/2019 | Ramasamy et al. |
| 2019/0042601 A1 | 2/2019 | Ashe |
| 2019/0042988 A1 | 2/2019 | Brown et al. |
| 2019/0057165 A1 | 2/2019 | Rosen et al. |
| 2019/0073350 A1* | 3/2019 | Shiotani ................ G06F 40/186 |
| 2019/0080416 A1 | 3/2019 | Smith et al. |
| 2019/0116398 A1 | 4/2019 | Sharma |
| 2019/0130468 A1 | 5/2019 | Lerman et al. |
| 2019/0164063 A1 | 5/2019 | Moura et al. |
| 2019/0164313 A1 | 5/2019 | Ma et al. |
| 2019/0197916 A1 | 6/2019 | Park |
| 2019/0199718 A1 | 6/2019 | Nigam et al. |
| 2019/0205476 A1* | 7/2019 | Jagadeesan ......... G06F 16/9535 |
| 2019/0220867 A1 | 7/2019 | Karani et al. |
| 2019/0236205 A1 | 8/2019 | Jia et al. |
| 2019/0297186 A1 | 9/2019 | Karani |
| 2019/0392024 A1 | 12/2019 | Singh et al. |

(56) References Cited

U.S. PATENT DOCUMENTS

| | | | |
|---|---|---|---|
| 2020/0005117 A1 | 1/2020 | Yuan et al. | |
| 2020/0029113 A1 | 1/2020 | Dacus et al. | |
| 2020/0043019 A1 | 2/2020 | Hadavand et al. | |
| 2020/0065122 A1 | 2/2020 | Ziraknejad et al. | |
| 2020/0065307 A1 | 2/2020 | Roy et al. | |
| 2020/0065342 A1 | 2/2020 | Panuganty | |
| 2020/0065791 A1 | 2/2020 | Patil et al. | |
| 2020/0074871 A1* | 3/2020 | Zhou | G09B 5/00 |
| 2020/0126540 A1 | 4/2020 | Panchamgam et al. | |
| 2020/0143102 A1 | 5/2020 | Ziraknejad et al. | |
| 2020/0159919 A1 | 5/2020 | Sims et al. | |
| 2020/0160612 A1* | 5/2020 | Bowen | G06F 30/20 |
| 2020/0186836 A1 | 6/2020 | Milanfar et al. | |
| 2020/0192965 A1 | 6/2020 | Imtiaz et al. | |
| 2020/0193591 A1 | 6/2020 | Kamiyama et al. | |
| 2020/0251111 A1 | 8/2020 | Temkin et al. | |
| 2020/0321005 A1* | 10/2020 | Iyer | G10L 15/193 |
| 2020/0327564 A1* | 10/2020 | Simard | G16H 40/63 |
| 2020/0387550 A1 | 12/2020 | Cappetta et al. | |
| 2020/0389317 A1 | 12/2020 | Dunjic et al. | |
| 2020/0394265 A1 | 12/2020 | Ray et al. | |
| 2020/0395001 A1 | 12/2020 | Mohanty et al. | |
| 2020/0395016 A1 | 12/2020 | Kapila et al. | |
| 2020/0401580 A1* | 12/2020 | Fitzpatrick | G06F 16/24578 |
| 2020/0401593 A1 | 12/2020 | Panuganty et al. | |
| 2021/0073874 A1 | 3/2021 | Wish | |
| 2021/0081902 A1 | 3/2021 | Pena et al. | |
| 2021/0084032 A1 | 3/2021 | Ding et al. | |
| 2021/0117664 A1 | 4/2021 | Rizvi et al. | |
| 2021/0133269 A1 | 5/2021 | Shah et al. | |
| 2021/0141794 A1 | 5/2021 | Picorel et al. | |
| 2021/0142763 A1 | 5/2021 | Notani et al. | |
| 2021/0149906 A1 | 5/2021 | Li et al. | |
| 2021/0201916 A1 | 7/2021 | Touret et al. | |
| 2021/0203747 A1 | 7/2021 | Gorsica, IV et al. | |
| 2021/0224345 A1 | 7/2021 | Shah et al. | |
| 2021/0240759 A1 | 8/2021 | Hwang et al. | |
| 2021/0240773 A1 | 8/2021 | Chen et al. | |
| 2021/0248135 A1 | 8/2021 | Rigney et al. | |
| 2021/0263916 A1 | 8/2021 | Niu et al. | |
| 2021/0271727 A1 | 9/2021 | Fan et al. | |
| 2021/0278938 A1 | 9/2021 | Fan et al. | |
| 2021/0295030 A1 | 9/2021 | Hwang et al. | |
| 2021/0342338 A1 | 11/2021 | Nocedal et al. | |
| 2021/0357378 A1 | 11/2021 | Urdiales et al. | |
| 2021/0383590 A1 | 12/2021 | Roimela et al. | |
| 2023/0008424 A1 | 1/2023 | Rigney et al. | |
| 2023/0029927 A1 | 2/2023 | Ziraknejad et al. | |
| 2023/0144009 A1* | 5/2023 | Andersen | G06F 40/14 715/237 |

OTHER PUBLICATIONS

Notice of Allowance in U.S. Appl. No. 16/688,065, dated Sep. 30, 2021, 9 pages.
Notice of Allowance in U.S. Appl. No. 17/021,116, dated Jan. 20, 2022, 8 pages.
Notice of Allowance in U.S. Appl. No. 17/316,201, dated Jun. 2, 2022, 8 pages.
Office Action in U.S. Appl. No. 16/804,575, dated Feb. 15, 2022, 12 pages.
Office Action in U.S. Appl. No. 16/804,644, dated Apr. 22, 2021, 37 pages.
Office Action in U.S. Appl. No. 16/804,644, dated Mar. 17, 2022, 47 pages.
Office Action in U.S. Appl. No. 16/804,644, dated Oct. 28, 2021, 45 pages.
Office Action in U.S. Appl. No. 17/021,116, dated Sep. 8, 2021, 24 pages.
Office Action in U.S. Appl. No. 17/065,837, dated Feb. 11, 2022, 12 pages.
Office Action in U.S. Appl. No. 17/084,574, dated Jan. 13, 2022, 30 pages.
Office Action in U.S. Appl. No. 17/155,365, dated Mar. 28, 2022, 14 pages.
Office Action in U.S. Appl. No. 17/172,767, dated Jan. 6, 2022, 9 pages.
Office Action in U.S. Appl. No. 17/179,479, dated Apr. 8, 2022, 9 pages.
Office Action in U.S. Appl. No. 17/180,171, dated Apr. 27, 2022, 32 pages.
Office Action in U.S. Appl. No. 17/316,201, dated Feb. 15, 2022, 25 pages.
Notice of Allowance in U.S. Appl. No. 17/179,479, dated Sep. 27, 2022, 7 pages.
Office Action in U.S. Appl. No. 16/248,659, dated Dec. 22, 2022, 20 pages.
Office Action in U.S. Appl. No. 16/804,575, dated Oct. 6, 2022, 13 pages.
Office Action in U.S. Appl. No. 17/155,365, dated Sep. 27, 2022, 18 pages.
Office Action in U.S. Appl. No. 17/166,023, dated Jan. 3, 2023, 21 pages.
Office Action in U.S. Appl. No. 17/180,171, dated Dec. 5, 2022, 39 pages.
Notice of Allowance in U.S. Appl. No. 16/723,413, dated Mar. 13, 2023, 23 pages.
Notice of Allowance in U.S. Appl. No. 16/783,998, dated Feb. 9, 2023, 16 pages.
Notice of Allowance in U.S. Appl. No. 17/097,489, dated Sep. 20, 2022, 15 pages.
Notice of Allowance in U.S. Appl. No. 17/155,365, dated Feb. 15, 2023, 13 pages.
Office Action in U.S. Appl. No. 16/804,575, dated Feb. 24, 2023, 15 pages.
Office Action in U.S. Appl. No. 17/084,574, dated Feb. 16, 2023, 41 pages.
Office Action in U.S. Appl. No. 17/097,489, dated Apr. 1, 2022, 17 pages.
"Screenshots Showing Example of Grammarly Web Browser Extension", Aug. 19, 2019, 2 pages.
community.microstrategy.com [online] "Amazon's Alexa: Key Analytics Applications That Deliver Voice-activated Reporting," May 2017, retrieved on May 21, 2020, retrieved from URL <https://community.microstrategy.com/s/article/Amazon-s-Alexa-Key-Analytics-Applications-That-Deliver-Voice-activated-Reporting?language=en_US>, 4 pages.
community.microstrategy.com [online], "How to Implement Voice-controlled Data Analytics With Amazon's Alexa", May 2017, retrieved on May 21, 2020, retrieved from URL <https://community.microstrategy.com/s/article/How-to-Implement-Voice-controlled-Data-Analytics-With-Amazon-s-Alexa?language=en_US>, 3 pages.
community.microstrategy.com [online], "HyperVoice and HyperVision," Feb. 2019, retrieved on May 21, 2020, retrieved from URL <https://community.microstrategy.com/s/question/0D544000073QxyCCAS/hypervoice-and-hypervision?language=en_US>, 2 pages.
community.microstrategy.com [online], "What is MicroStrategy HyperIntelligence?," 2019, retrieved on May 21, 2020, retrieved from URL <https://community.microstrategy.com/s/article/KB442388-What-is-MicroStrategy-HyperIntelligence?language=en_US> 12 pages.
Constellationr.com [online], "MicroStrategy Embeds Analytics Into Any Web Interface" Feb. 12, 2019, retrieved on Jan. 15, 2020, retrieved from URL <https://www.constellationr.com/blog-news/microstrategy-embeds-analytics-any-web-interface>, 8 pages.
Css-tricks.com [online], "Extracting Text from Content Using HTML Slot, HTML Template and Shadow DOM," Mar. 6, 2019, retrieved on Jan. 15, 2020, retrieved from URL <https://css-tricks.com/extracting-text-from-content-using-html-slot-html-template-and-shadow-dom/>, 6 pages.
Developer.mozilla.org [online], "High-level view," Jan. 29, 2018, retrieved on Jan. 15, 2020, retrieved from URL < https://developer.mozilla.org/en-US/docs/Web/Web_Components/Using_shadow_DOM>, 6 pages.
doughenschen.com [online], "MicroStrategy Embeds Analytics Into Any Web Interface" Feb. 2019, retrieved on May 21, 2020, retrieved

(56) References Cited

OTHER PUBLICATIONS from UR: <https://doughenschen.com/2019/02/10/microstrategy-embeds-analytics-into-any-web-interface/>, 6 pages.
eweek.com [online], "MicroStrategy Streamlines Analytics With 'Zero Clicks' UI," Jan. 2019, retrieved on May 21, 2020, retrieved from URL<https://www.eweek.com/enterprise-apps/microstrategy-streamlines-analytics-with-zero-clicks-ui>, 5 pages.
Forbes.com [online], "These Ex-Israeli Surveillance Agents Hijack Your Browser to Profit From Ads," Jun. 9, 2015, retrieved on Jan. 15, 2020, retrieved from URL <https://www.forbes.com/sites/thomasbrewster/2015/06/09/from-israel-unit-8200-to-ad-men/#3ff26d7926e2>, 11 pages.
Github.com [online], "Non-invasive way of making highlights—maybe with an overlay? #291," Nov. 30, 2013, retrieved on Jan. 15, 2020, retrieved from URL <https://github.com/openannotation/annotator/issues/291>, 19 pages.
Github.com [online], "Textus," Oct. 27, 2012, retrieved on Jan. 15, 2020, retrieved from URL <https://github.com/okfn/textus>, 2 pages.
Glazkov.com [online], "What the Heck is Shadow DOM?," Jan. 14, 2011, retrieved on Jan. 15, 2020, retrieved from URL <https://glazkov.com/2011/01/14/what-the-heck-is-shadow-dom/>, 43 pages.
idevnews.com [online], "MicroStrategy 2019 Brings AI/ML & Sematic Technologies to BI, Analytics," Feb. 2019, retrieved on May 21, 2020, retrieved from URL <https://www.idevnews.com/stories/7248/MicroStrategy-2019-Brings-AIML-Sematic-Technologies-to-BI-Analytics>, 3 pages.
Lippens, "Amazon's Alexa: Key Analytics Applications That Deliver Voice Activated Reporting," May 2017, MicroStrategy, 23 pages.
Lippens, "Your Voice is Your Passport: Implementing Voice-driven Applications with Amazon Alexa," 2017, Microstragey, 33 pages.
Lippens, "How to Implement Voice-controlled Data Analytics With Amazon's Alexa," May 2017, Microstrategy, 4 pages.
Medium.com [online], "Steps to Understanding the Shadow DOM," Feb. 22, 2019, retrieved on Jan. 15, 2020, retrieved from URL <https://medium.com/quick-code/understanding-the-shadow-dom-20e691cc611b>, 22 pages.
microstrategy.com [online], "7 Trending Technology Sessions You Won't Want to Miss at MicroStrategy World 2019," Dec. 2018, retrieved on May 21, 2020, retrieved from URL <https://www.microstrategy.com/us/resources/blog/bi-trends/seven-trending-technology-sessions-at-microstrateg>, 10 pages.
Microstrategy.com [online], "HyperIntelligence", available on or before Jan. 15, 2019, retrieved on Jan. 15, 2020, retrieved from URL <https://www.microstrategy.com/us/product/hyperintelligence>, 3 pages.
microstrategy.com [online], "Microstrategy 2019, the Platform for the Intelligent Enterprise" May 2019, retrieved on May 22, 2020, retrieved from URL <https://www.microstrategy.com/getmedia/4b9fbd76-952b-4da5-8f8d-489278abd59c/MicroStrategy-2019-whitepaper>, 14 pages.
microstrategy.com [online]. "Build and Deploy HyperCards Using Workstation," Feb. 2019, retrieved on May 21, 2020, retrieved from URL <https://www.microstrategy.com/getmedia/8103f59b-3416-4a33-bd6a-2e99c9afd474/Build-and-Deploy-HyperCards-Using-Workstation>, 30 pages.
microstrategy.com, [online], "Whats New in Microstrategy 2019", 2019, retrieved on May 21, 2020, retrieved from URL <https://www.microstrategy.com/getmedia/de71bdb6-6d88-4e62-90d5-0e4a3cf94bb6/whats-new-in-microstrategy-2019>, 138 pages.
Nicolasleroy.fr [online], "TheFind launches price comparison service", Nov. 19, 2009, retireved on May 14, 2012, retrieved from URL <http://www.nicolasleroy.fr/wp/2009/11/thefind-launches-price-comparison-service/ >, 6 pages.
prnewswire.com "MicroStrategy 2019, the World's Most Advanced Analytics & Mobility Platform, Powers Decisions for Every Moment of the Day" Jan. 2019, retrieved on May 21, 2020, retrieved from URL <https://www.prnewswire.com/in/news-releases/microstrategy-2019-the-world-s-most-advanced-analytics-amp-mobility-platform-powers-decisions-for-every-moment-of-the-day-867142447.html>, 7 pages.

Robdodson.me [online], "Shadow DOM: JavaScript," Sep. 2, 2013, retrieved Jan. 15, 2020, retreived from URL <https://robdodson.me/shadow-dom-javascript/>, 11 pages.
Solutionsreview.com [online], "MicroStrategy 2019 Features New HyperCards and Federated Analytics," Jan. 7, 2019, retrieved on Jan. 15, 2020, retrieved from URL <https://solutionsreview.com/business-intelligence/microstrategy-2019-features-new-hypercards-and-federated-analytics/>, 4 pages.
Solutionsreview.com [online], "MicroStrategy Extends HyperIntelligence with New Platform Update," Jul. 1, 2019, retrieved on Jan. 15, 2020, retrieved from URL <https://solutionsreview.com/business-intelligence/microstrategy-extends-hyperintelligence-with-new-platform-update/>, 4 pages.
US Notice of Allowance in U.S. Appl. No. 16/788,530, dated Feb. 22, 2021, 12 pages.
US Office Action in U.S. Appl. No. 16/247,892 dated Jul. 15, 2021, 25 pages.
US Office Action in U.S. Appl. No. 16/247,892, dated Jan. 13, 2020, 20 pages.
US Office Action in U.S. Appl. No. 16/247,892, dated Jun. 4, 2020, 26 pages.
US Office Action in U.S. Appl. No. 16/247,892, dated Mar. 10, 2021, 29 pages.
US Office Action in U.S. Appl. No. 16/248,659, dated Dec. 17, 2020, 5 pages.
US Office Action in U.S. Appl. No. 16/248,659, dated Feb. 14, 2022, 19 pages.
US Office Action in U.S. Appl. No. 16/248,659, dated Feb. 17, 2021, 14 pages.
US Office Action in U.S. Appl. No. 16/248,659, dated Jul. 16, 2021, 17 pages.
US Office Action in U.S. Appl. No. 16/723,413, dated Dec. 29, 2021 23 pages.
US Office Action in U.S. Appl. No. 16/730,417, dated Feb. 11, 2021, 19 pages.
US Office Action in U.S. Appl. No. 16/730,417, dated Sep. 23, 2021, 9 pages.
US Office Action in U.S. Appl. No. 16/730,417. Dated Aug. 4, 2020, 22 pages.
US Office Action in U.S. Appl. No. 16/783,998, dated Feb. 16, 2022, 35 pages.
US Office Action in U.S. Appl. No. 16/788,530, dated Jun. 25, 2020, 21 pages.
Vibrantmedia.com [online], "FAQs: Vibrant In-Text Advertising," retrieved on Mar. 31, 2011, retrieved from URL <http://www.vibrantmedia.com/in-text_advertising/faq.asp>, 2 pages.
Vibrantmedia.com [online], "In-Text Demo," retrieved on Mar. 31, 2011, retrieved from URL <http://www.vibrantmedia.com/in-text_advertising/demo.asp>, 2 pages.
Wikipedia.com [online], "In-text advertising", Mar. 2017, retrieved on Jan. 15, 2020, retrieved from URL <https://en.wikipedia.org/w/index.php?title=In-text_advertising&oldid=770109369>, 2 pages.
Wikipedia.com [online], "Web Components," Dec. 2017, retrieved on Jan. 15, 2020, retrieved from URL <https://en.wikipedia.org/w/index.php?title=Web_Components&oldid=815726999>, 5 pages.
zdnet.com [online], "MicroStrategy 2019 introduces "HyperIntelligence" contextual BI," Jan. 2019, retrieved on May 21, 2020, retrieved from URL <https://www.zdnet.com/article/microstrategy-2019-brings-introduces-hyperintelligence-contextual-bi/>. 6 pages.
Notice of Allowance in U.S. Appl. No. 16/247,892, dated Jul. 7, 2022, 6 pages.
Notice of Allowance in U.S. Appl. No. 17/065,837, dated Jul. 28, 2022, 10 pages.
Notice of Allowance in U.S. Appl. No. 17/172,767, dated Jul. 5, 2022, 9 pages.
Office Action in U.S. Appl. No. 16/248,659, dated Jul. 18, 2022, 17 pages.
Office Action in U.S. Appl. No. 16/783,998, dated Sep. 20, 2022, 39 pages.
Office Action in U.S. Appl. No. 16/804,575, dated Jun. 24, 2022, 14 pages.
Office Action in U.S. Appl. No. 16/804,644, dated Sep. 16, 2022, 49 pages.

(56) References Cited

OTHER PUBLICATIONS

Office Action in U.S. Appl. No. 17/084,574, dated Aug. 19, 2022, 38 pages.
Office Action in U.S. Appl. No. 17/180,171, dated Jul. 29, 2022, 40 pages.
Office Action in U.S. Appl. No. 17/961,368, dated Jun. 23, 2023, 35 pages.
Office Action in U.S. Appl. No. 16/248,659, dated Jul. 6, 2023, 9 pages.
Office Action in U.S. Appl. No. 16/723,413, dated Jun. 21, 2022, 27 pages.
Afzal et al., "Perception of Emotional Expressions in Different Representations Using Facial Feature Points," In Proceedings of International Conference on Affective Computing and Intelligent Interaction and Workshops, Amsterdam, Netherlands, Sep. 10-12, 2009, 1-6.
Notice of Allowance in U.S. Appl. No. 16/804,644, dated Aug. 18, 2023, 10 pages.
Notice of Allowance in U.S. Appl. No. 17/166,023, dated Oct. 30, 2023, 9 pages.
Office Action in U.S. Appl. No. 16/804,575, dated Jul. 19, 2023, 19 pages.
Office Action in U.S. Appl. No. 16/804,575, dated Oct. 26, 2023, 16 pages.
Office Action in U.S. Appl. No. 17/084,574, dated Jul. 21, 2023, 46 pages.
Office Action in U.S. Appl. No. 17/165,355, dated Jun. 30, 2023, 33 pages.
Office Action in U.S. Appl. No. 17/165,355, dated Mar. 24, 2023, 31 pages.
Office Action in U.S. Appl. No. 17/166,023, dated Jun. 23, 2023, 17 pages.
Office Action in U.S. Appl. No. 17/180,171, dated Jun. 9, 2023, 11 pages.
Office Action in U.S. Appl. No. 17/180,171, dated Oct. 27, 2023, 74 pages.
Office Action in U.S. Appl. No. 17/935,201, dated Mar. 28, 2023, 8 pages.
Office Action in U.S. Appl. No. 17/935,201, dated Sep. 12, 2023, 11 pages.
Shivashankar et al., "Emotion Sensing Using Facial Recognition," International Conference on Smart Technologies for Smart Nation, Aug. 2017, 830-833.
US Notice of Allowance in U.S. Appl. No. 16/805,575, dated Mar. 6, 2024, 8 pages.
US Notice of Allowance in U.S. Appl. No. 17/935,201, dated Jan. 31, 2024, 8 pages.
US Notice of Allowance in U.S. Appl. No. 17/961,368, dated Apr. 11, 2024, 23 pages.
US Office Action in U.S. Appl. No. 17/084,574, dated Mar. 6, 2024, 46 pages.
Office Action in U.S. Appl. No. 17/084,574, dated Jul. 18, 2024, 41 pages.
Office Action in U.S. Appl. No. 17/180,171, dated May 10, 2024, 30 pages.

* cited by examiner

Ann Smith
Director, Sales Operations • asmith@hyperintelligence
🔗 Company Dossier 🔗 http://www.microstrategy.com abc  Company Website 712                              Apply

Ja⋯
Di⋯                                              ⋯er

300⋯
Phone number | Current City | Department

Lexington
Home Town | Boston
Office Location | Skateboarding
Fun Fact

North America

Region | People
Management
Skills | Massachusetts
Institute of...
University

3
Tenure | 0.89
Score | 0
Patents

Self-starter who work with the team to bring the best product to the right customer

GENERATING AND PRESENTING CUSTOMIZED INFORMATION CARDS

CROSS-REFERENCE TO RELATED APPLICATIONS

This application is a continuation of U.S. patent application Ser. No. 16/730,417, filed Dec. 30, 2019, which is a continuation-in-part of U.S. patent application Ser. No. 16/247,892, filed on Jan. 15, 2019, which claims priority to U.S. Provisional Patent Application No. 62/720,955 filed on Aug. 22, 2018. This application is a continuation-in-part of U.S. patent application Ser. No. 16/248,659, filed on Jan. 15, 2019, which claims priority to U.S. Provisional Patent Application No. 62/720,955 filed on Aug. 22, 2018. This application also claims the benefit of U.S. Provisional Patent Application No. 62/810,498, filed on Feb. 26, 2019, and U.S. Patent Application Ser. No. 62/802,047, filed on Feb. 6, 2019. The entire contents of each of the prior applications is incorporated by reference herein.

BACKGROUND

Databases often include information about many topics. Users often retrieve content from issuing a query, for example, using natural language or using a structured query language (SQL).

SUMMARY

In some implementations, a computing system facilitates the generation and publication of customized information cards that can be tailored for specific organizations and users. The system can provide an interface for an administrator to select specific data sources and define a card format that draws specific types of information from those data sources. The system can also provide functionality for an administrator to associate specific card formats with specific entities and keywords, so that references to those entities and keywords trigger access to or display of the information cards. In addition, the system can publish the information cards throughout an enterprise's computing infrastructure so that the information cards can be accessed on many devices with very low latency. For example, the data defining the information cards and the keywords and other conditions for triggering their presentation can be provided to one or more server systems, and can also be predictively generated and cached (e.g., at servers and/or client devices). In some implementations, these techniques allow for the presentation of the information cards in one second or less after a user interaction that triggers surfacing of an information card. Once published, the information cards can be stored and made available throughout an enterprise's computing infrastructure, for presentation on any appropriate client device when the keywords for the information card appear (e.g., in on-screen content, in metadata, in voice input, on mobile devices, etc.).

The information cards provide live, dynamically updated data, so that sequential presentations of the same information card can provide different values for attributes and metrics as the information in the data source changes. The information cards can be defined to maintain connections with the underlying data sources, so that the information cards are refreshed with current data on an ongoing basis. As a result, the content in the information card can provide a dynamic, up-to-date window to a data source rather than a static set of content.

The system allows for the creation and presentation of information cards with many dimensions of customizability, including the ability to specify and adjust characteristics of an information card including one or more of, for example, (1) which information cards to provide, (2) the set of information to present in each information card, (3) the data source(s) the information is derived from, (4) the format of the respective information cards, (5) the keywords and/or conditions for presentation of the respective information cards, (6) the access control and availability of the respective information cards to users and systems. The user interfaces and/or application programming interfaces (APIs) provided by the system may enable these and other aspects of the information cards to be customized (e.g., specified and adjusted) through user input or through automated processing of the system. Each organization can customize the information cards that are used, and what those information cards represent (e.g., specific companies, people, locations, products, etc.). The information cards can be specific to the needs and relationships of the organization deploying the cards to its members. An information card can present a customized set of information, such as a customized subset of attributes and metrics for an entity. The information presented in the card can be drawn from a customized data source, e.g., a specific data cube, a private database, a combination of data sources, or other source. The information card can have a customized format, e.g., with a layout, style, and organization that is personalized for an organization. The information card can be triggered for display based on a customized set of keywords, e.g., an entity name as well as synonyms, aliases, related terms, abbreviations, etc. The system can also customize access to information cards, with information cards being selectively made accessible to different departments, groups of users, user roles, or individual users. Similarly, access to information cards and/or the content of information cards can be varied according for security and data access control based on a user's credentials, data access privileges, authentication level, and so on.

In addition, the information cards can be customized further for an organization and can be personalized for groups of users or individual users. For example, access logs and other usage data for an organization can be used to vary the types of content that an information card includes over time. If users frequently request or view a certain metric regarding a particular entity, the system can detect the high-frequency access and add the metric to an information card for the particular entity or make the metric more prominent (e.g., by adjusting position, ranking, size, etc.) As another example, the same information card may be presented differently for different users based on factors such as the user's usage history, user profile, preferences, role in the organization, and so on.

In many situations, it is extremely difficult for a system or an end user to pick the most important types of information that matter for an item (e.g., an entity, record, object, etc.) For example, most analytics systems have thousands of objects and data elements that are related to a given object or topic and could potentially be shown to a user. For example, a database may have information about objects with a "Customer" object type. Each object of this type may have dozens, hundreds, thousands, or more different associated data elements (e.g., attributes, metrics, records, etc.). If a user shows interest in a particular customer object, it can be very difficult for the system to determine which of the many available pieces of data are relevant and useful for the user. Further, the specific data elements that are most important for a given object may be different for different organizations and even for different groups of users or different individual users. As a result, a generic information card generally cannot provide the value that a customized card with a selection of data elements designed for a particular organization can provide.

Using information cards allows the system to associate key items with an object, thus enabling the system to show the most useful information about a topic. This is especially important on devices with voice interfaces and for embedded applications where the user doesn't have the user interface to scan or filter through thousands of possible objects. The information card for an object or object type can specify a specific subset of the most important data elements related to an object, helping ensure that the data presented is applicable and relevant to the user and the tasks the user is performing.

A computing device can run software that monitors conditions of the computing device and detects when content is relevant to the current state or operations of the computing device. For example, in response to detecting an appropriate context, event, or condition, the computing device presents an information card or a control allowing the user to access the information card. The information card can include a customized set of information selected from one or more data sources. In particular, the data sources may be public data sources, private databases or other internal records By defining and presenting custom information cards, an organization can automatically provide information from a public data source, private database or other custom data source at the specific time that the information is relevant to the user. In many cases, the card can be provided without requiring the user to request or seek out the information. Content relevant to a user's current task or activity can be provided, often without requiring the user to leave the current user interface. Thus, as a user creates a message, views a calendar appointment, looks up a contact from a contact book, or performs another activity, content determined to be related to the activity may be made available from the current user interface.

In many conventional systems, a user typically needs to submit a query, open or switch to a specific application, or otherwise take steps to request content from databases and other data sources. By contrast, techniques discussed in this document enable a computing device to dynamically select and provide database information without a user request, based instead on context such as content displayed by the computing device, a location of the computing device, messages to or from the computing device, and so on.

The ability to dynamically provide database content as the context of a computing device changes can be particularly useful for mobile devices. Software on the computing device that runs in the background can cause information cards to be presented on various interfaces of an operating system or third-party applications. For example, the presentation of information cards with database content can be integrated with a messaging application, a calendar application, search functionality, or any other application or interface.

As discussed further below, both the timing for providing database content and the selection of the content provided can be determined using context of the computing device. One aspect of context that is used is the presence of terms referring to entities, such as people, locations, objects, companies, etc., having corresponding records in a database. A computing system can dynamically retrieve and present information corresponding to an entity based on monitoring context-specific trigger conditions on a computing device. The information cards can include database content that is indexed by keywords, such as entity names, metadata for the entity, or topics associated with an entity classification. For example, a computing device can run an application that monitors activity on the computing device to determine if trigger conditions related to keywords have been satisfied. Examples of these triggers include the presence of an entity-related keyword in a user interface, an email or text message, a calendar reminder or record, a search query or search result, speech recognition of a voice query, a video or image collected by a camera, among others.

In general, any object in an analytics platform may serve as an "entity" that is the subject of an information card. Similarly, any object type may be an "entity type" as well. Cards are not required to be based on specific objects and object types, and can still provide information about people, places, things, and so on without a specific object being defined. Nevertheless, any object or object type, or an item that is represented or can be represented as an object or object type, can serve as the entity or entity type discussed below as the subject of an information card.

If a trigger condition is satisfied, the application causes an information card or information panel to be displayed on or spoken through the computing device. This technique allows a user to easily access or obtain information that is contextually relevant to actions performed on the computing device, without requiring the user to manually access the information or provide additional inputs. As discussed below, other techniques disclosed herein also provide other advantages, such as allowing users to receive information that may be difficult to manually retrieve from a database.

In some implementations, the information cards can be displayed on a computing device without requiring a user to request that information be displayed. The computing device can run an application that monitors actions performed on the computing device. The application uses the monitored actions to track the occurrence of keywords that can then be used to display information cards at specified points in time when the user is likely view information included in the information cards. For example, the application can monitor calendar data, including notifications or reminders issued by a separate calendar application, to detect an upcoming calendar appointment. The application determines that the calendar data includes text corresponding to an entity associated with a user information card. In response, the application then causes the information card to be displayed on the computing device. For example, the application can cause the information card to be presented along with a notification from the calendar application, or based on the appointment time (e.g., fifteen minutes before the start time of the calendar appointment so that the user can access relevant entity information during the calendar appointment). The application minimizes the burden imposed on the user, as the user does not need to open a calendar application, or look up an appointment, or even know that database content relevant to the appointment is available. Still, the computing system provides contextually-relevant information for the appointment triggered by monitoring the calendar data and without requiring the user to perform any actions to instruct the mobile device to retrieve the information card.

The keywords monitored by the application can be customized for different actions performed on the mobile device and a user's account. In some instances, the set of keywords that trigger display of database content are specific to a user or the user's organization. For example, when the user is an employee of a company, the keywords of interest can be extracted from a private database for the company. The keywords can additionally or alternatively be selected or filtered to terms applicable to the specific user, e.g., terms relevant to the user's role in the company. When one of the keywords is determined to be present in the user interface, the application communicates with a server system to obtain information related to the keyword. This information can include data retrieved from a private database that has information specific to an organization associated with the user.

In some implementations, a computing system can identify keywords in a user interface and dynamically retrieve and present relevant information inline with the user interface. For example, a client device can run a software agent, such as a web browser extension, that monitors a user interface for instances of certain keywords. When the keywords are present, the software agent annotates the keywords and makes them interactive in the user interface. If a user interacts with a keyword, for example, by placing a cursor over the keyword, the software agent causes an information card or information panel to be displayed, e.g., overlaying a portion of the original user interface or otherwise inserted into the user interface. In this manner, the user can easily access information that is contextually relevant to the user interface, without the need to open a new application or switch between interfaces. This technique also provides numerous other advantages, discussed below, such as allowing content to be efficiently integrated with third-party user interfaces that the content provider does not control.

The system allows for significant customizability. These keywords monitored by the software agent can be specific to a user or the user's organization. For example, when the user is an employee of a company, the keywords of interest can be extracted from a private database for the company. The keywords can additionally or alternatively be selected or filtered to terms applicable to the specific user, e.g., terms relevant to the user's role in the company. When one of the keywords is determined to be present in the user interface, the software agent communicates with a server system to obtain information related to the keyword. This information can include data retrieved from a private database that has information specific to an organization associated with the user. For example, if the keyword refers to a customer of a user's company, status information, statistics, contact information, and other information about the customer's account with the company can be provided from the company's private database.

The type of information provided, as well as the values shown for those information types, can be customized for the user and organization. For example, a sales representative and a product engineer at the same company may be shown different types of information for the same keyword, due to their different roles. Similarly, two users in a company with the same role might be shown different information for the same keyword, due to the users having different types of previous interactions with the system. In general, the system can use machine learning techniques to predictively select which information to show to a particular user at a particular time for a given keyword, and how to organize the information.

In many conventional systems, user interfaces have a predetermined structure or layout designed to accommodate the content displayed. To add a new frame or region of the interface, the structure of each user interface to be updated usually must be changed one by one. For example, to provide embedded content in a web page or web application, the user interface is often designed to include an iFrame or other element for the embedded content. Native applications also generally have pre-defined user interface layouts. This often makes it difficult to add or alter embedded content regions in user interfaces because the source code, HTML code, or other data defining each user interface needs to be individually changed. For example, it may be desirable to provide a new embedded content region in each of many different pages of a web site or web application, but doing so may require changes to each of the pages individually.

Embedding content is also challenging because the party desiring to embed the content may not control or have the ability to change the underlying user interface. For example, one company may have content to be embedded in an application provided by a different company. The content provider would need to rely on the application provider to modify the structure of the application, one page at a time, in order to have the content embedded. For example, it is often difficult for a company to integrate content from its proprietary database into a user interface provided by a third party, e.g., an e-mail application, a word processing application, a spreadsheet application, etc., because the company generally cannot change the structure of the user interface provided by the third-party.

The challenge of embedding content in user interfaces is also significant since the embedded content may be needed only selectively. For example, it may be desirable to embed content on some pages but not others. Similarly, the embedded content may only be applicable for a page at certain times and not others. The need for the embedded content may vary over time, and may be dependent on factors such as the context provided by other content in the page, which may also vary over time. As a result of these factors and others, simply adjusting a general template for many pages cannot perform the fine-grained integration of embedded content, since the decisions whether to embed content and what content to embed is often a page-specific decision that changes over time.

The techniques discussed in this document address these challenges by allowing content to be presented inline with web pages and applications that the content provider does not control and cannot modify. Similarly, the system can be configured to provide content inline with other content that has not been created yet, such as web pages or web applications that are not yet available.

The techniques in this document also provide an efficient way for users to access information, such as analytics data, in a user interface. By allowing a user to call up an information card within existing user interface, the user no longer needs to switch applications and lose the context of the applications involved in the user's current task.

Traditionally, if a user is performing a task with an application and desires to look up information from an analytics platform or other database-backed platform, the user generally needs to switch applications or windows, log in, submit a query for the information desired, then wait for results to be returned. The delays, multiple steps required, and overall inconvenience often discourage users from looking up needed information.

By contrast, the techniques in the present application do not require the user to switch applications or interfaces, and contextually-relevant information is provided in the interface where the user needs the information. This provides needed information to just the right user, time, and user interface where the information is needed. Delays are minimal because the client device can request and receive contents of the information cards before the user indicates that the information should be displayed. The software agent on a client device can evaluate contents of the user interface, generate a query for a server system, and receive and format results for display so the information cards for each of multiple different terms are available for display before the user indicates the terms of interest. Also, the user can call up the information with a single action on the existing interface, such as a mouseover, click, or tap on an annotated term in the user interface.

Limited user interface space is conserved since the information card can be provided in the same window or area of the application the user is already using, with no need to switch between applications. Also, the information card is displayed and removed dynamically, so it is shown only when the user requests it. Unlike interfaces that include a dedicated, persistent area for content that may not be needed at most times, the present technique frees up more of the interface for use by an application.

The techniques discussed below also provide an efficient way to publish customized or private database content to users. The keywords or terms of interest to each organization can be set based on the private database contents for the organization. For example, each organization can have its own set of customers, employees, suppliers, product names, and so on reflected in its private database. Based on the database contents, terms have a semantic meaning that is specific to that organization, which the system uses to tailor the display of information for members of the organization.

In some implementations, the system provides an interface for an administrator to easily adjust the sets of terms that the system will highlight and make interactive for members of the organization by updating the database or identifying certain portions of a dataset. For example, an administrator can identify columns of a private database corresponding to employee names, customer names, and product names. The system extracts the contents of these columns and designates them as key terms for the organization. The current set of these terms can be downloaded to client devices of members of the organization when they authenticate to the software agents on the client devices, so each time the user authenticates the set of terms is refreshed at the client device based on the current state of the database. The information displayed in the information cards is also generated using the current records of the database. Thus, by designating certain records or fields from an organization's database, an administrator can adjust or update the set of content published to some or all members of the organization, which will be made available through many user interfaces (e.g., presented in-line with any web page or web application).

When a client device indicates that one of the key terms for the organization is present, the server system can access the underlying database record(s) corresponding to the term to generate relevant information to provide. The semantic meaning of the term that is applicable for the user and organization is used to provide customized results. For example, different types of information are provided based on the classification of the term, e.g., whether a term is the name of an employee, customer, or product. Different semantic classifications can have different data types or sets of information to be provided. Even for a particular classification, of the many potential types of data that may be provided, a subset can be selected based on analysis of the database contents (e.g., to identify trends or items that are popular, recent, or unusual according to various thresholds), relevance to the user (e.g., applicability to the user's historical behavior or role in the organization), and/or context (e.g., other keywords in the user interface, which may indicate geographical location, time, individuals, or other information relevant to the user's current task). In this process, the organizations security policies are preserved. If a user does not have authorization to access a field or record from the database, the server system will enforce access restrictions and will not provide the information. Consequently, different users even within the same organization may be presented different sets of information for the same term, due to the users' differing roles, interaction histories, access authorizations, and other factors.

In one general aspect, a method performed by one or more computers includes: obtaining, by the one or more computers, interface data indicating text of a user interface of an electronic device, wherein the electronic device is associated with a user that is part of an organization; determining, by the one or more computers, that a particular term in the text of the user interface of the electronic device satisfies one or more criteria; based on determining that the particular term satisfies the one or more criteria, annotating, by the one or more computers, the particular term to alter the appearance of the particular term in the user interface; after annotating the particular term, detecting, by the one or more computers, user interaction with the annotated term; and in response to detecting the user interaction with the annotated term, providing, by the one or more computers, a card for display in the user interface, the card comprising information corresponding to the term wherein the information is determined using content from a private database for the organization.

Implementations can include one or more of the following features. In some implementations, the method includes identifying a user associated with the electronic device; and downloading, to the electronic device, data indicating a set of terms determined based at least in part on the user or organization. Determining that the particular term in the text of the user interface of the electronic device satisfies one or more criteria comprises determining, by the electronic device, that the particular term is included in the set of terms downloaded to the electronic device.

In some implementations, the set of terms includes entity names extracted from the private database for the organization.

In some implementations, the set of terms includes terms identified from the private database for the organization and filtered based on an identity of the user or a role of the user in the organization.

In some implementations, annotating the particular term to alter the appearance of the particular term in the user interface comprises altering at least one of a font, size, style, spacing, underline, color, background, highlight, or bounding shape for the annotated term.

In some implementations, detecting user interaction with the annotated term comprises detecting at least one of a click, drag, mouseover, swipe, tap, hold gesture, or selection on the particular term.

In some implementations, the method includes: in response to detecting user interaction with the annotated term, generating, by the electronic device, a request that indicates the particular term; transmitting the request from the electronic device to the server system over a communication network; and receiving, from the server system over the communication network and, data provided by the server system in response to the request. The data is retrieved from or is generated using data retrieved from the private database for the organization; and providing the card for display in the user interface comprises providing, in the card, the data retrieved from or generated using data retrieved from the private database for the organization.

In some implementations, providing the card for display comprises causing the card to be displayed overlaying a portion of the user interface.

In some implementations, the user interface of the electronic device is a user interface of an application executing on the electronic device; and the obtaining, determining, detecting, annotating, and providing are performed using a software agent executing on the electronic device.

In some implementations, the application is a web browser, and wherein the software agent is a browser extension module for the web browser.

In some implementations, the particular term is a name of an entity, and wherein providing the card for display in the user interface comprises providing data indicating indicators related to the entity.

In some implementations, the entity has a first classification, and the types of indicators included correspond to a predetermined set of data types corresponding to the first classification.

In another general aspect, a method performed by one or more computers includes: receiving an indication of a data set; receiving data indicating a selection of an element of the data set; providing an indication of items in the data set that are associated with the selected element of the data set; receiving data indicating a selection of one or more of the items that are associated with the selected element of the data set; and storing card data defining an information card for the selected element of the data set, wherein the card definition data indicates (i) data indicating the selected one or more items, and (ii) a reference to the data set.

In some implementations, the reference to the data set is configured such that generating the information card based on the card data causes values for the selected one or more items to be derived from the data set and included for presentation in the information card.

In some implementations, the selection of the element of the data set or the selection of the one or more items is provided by a user.

In some implementations, the selection of the element of the data set or the selection of the one or more items is provided by a machine learning module.

In some implementations, the indication of a data set is a selection of the data set by a user.

In some implementations, the card data further includes presentation data indicating a layout or formatting for the selected one or more of items.

In some implementations, the card data indicates a first element of the data set designated for triggering display of the information card. The method includes obtaining data indicating a term corresponding to a context of a device; determining that the term matches at least one value for the first element of the data set; and in response to determining that the term matches at least one value for the first element of the data set, providing the information card for display by the device.

In some implementations, the selection of an element of the data set includes a selection of a particular attribute in the data set, wherein the data set includes multiple different values for the particular attribute. The card data enables generation of an information card instance for each of the different values for the particular attribute, the information card instances respectively having the selected one or more items populated with values corresponding to the different values for the particular attribute.

In some implementations, the card data further includes an indication of a user or group of users authorized to receive the information card.

In some implementations, the data set is a data cube, a database, or a collection one or more data files.

Other embodiments include corresponding systems, apparatus, and computer programs stored on computer-readable media, configured to perform the actions of the methods.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIGS. 7A and 7B are diagrams indicating user interfaces for creating or editing information cards.

FIG. 11 is a diagram illustrating an example of a user interface showing an information card provided in response to user interaction.

Like reference numbers and designations in the various drawings indicate like elements.

DETAILED DESCRIPTION

Figure 1A:
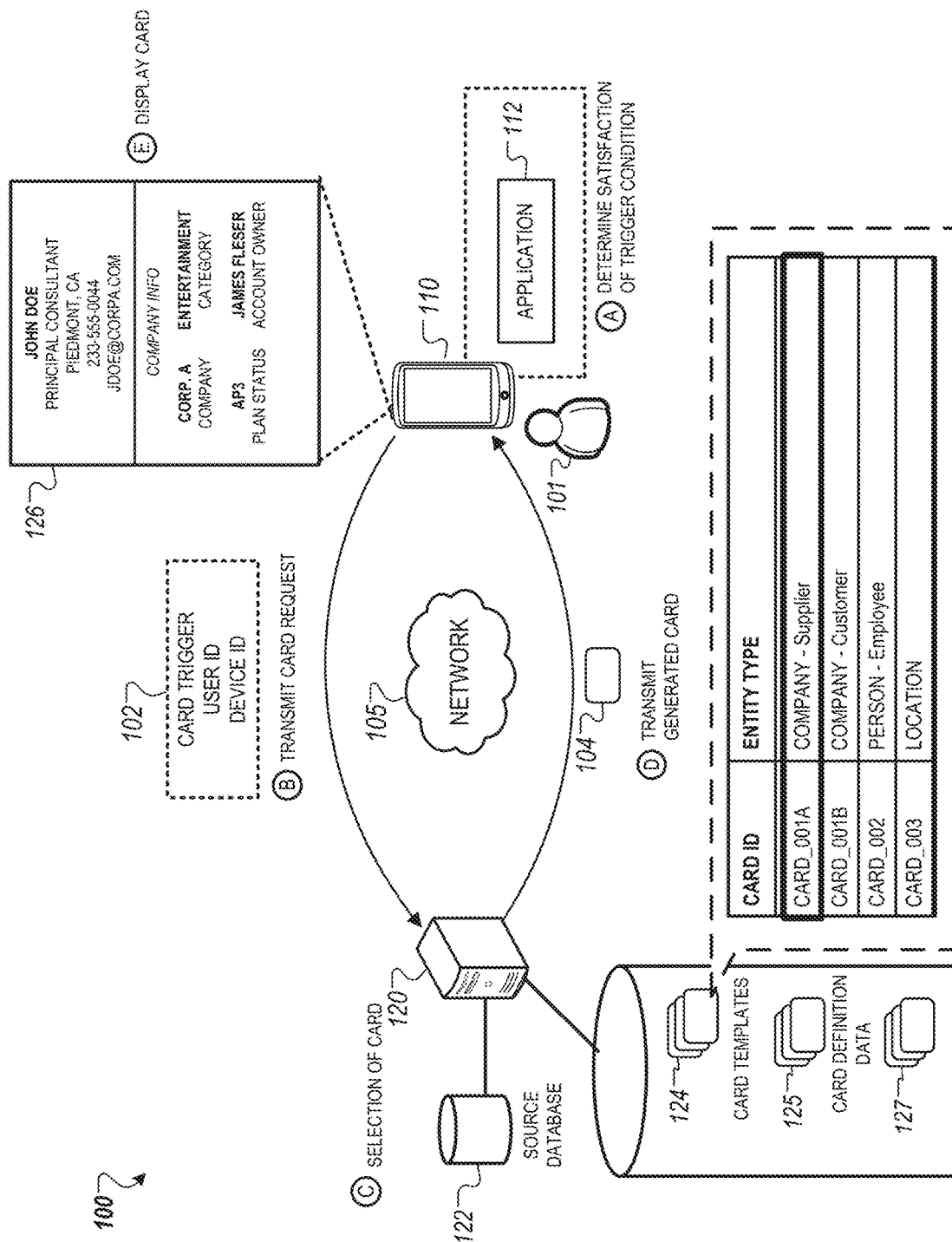
FIGS. 1A and 1B is a diagram showing an example of a system for generating and presenting customized information cards.

FIG. 1 illustrates an example of a system 100 that is capable of generating and presenting customized information cards. The system 100 includes a client device 110, a server 120, and a network 105. The server 120 has access to a source database 122 for an organization. The server 120 can be implemented using multiple computers that cooperate to perform the functions discussed below, and which may be located remotely from each other.

The client device 110 includes an application 112 that enables the client device 110 to dynamically generate and display contextually-relevant information cards in response to certain actions being performed on the client device 110 or certain conditions of the client device 110 being detected. As discussed below, the application 112 allows the client device 110 to obtain and provide information from the source database 122 through information cards that can be dynamically adjusted based on the actions or conditions detected on the client device 110. In some implementations, the application 112 runs in the background, out of view of the user, and monitors conditions of the client device 110 on an ongoing basis. The application 112 may interact with an operating system of the client device 110, for example, using one or more application programming interfaces (APIs), to obtain various types of content, such as image data and/or text displayed on screen, image data or text of user interfaces of applications (which may or may not be currently displayed on screen), device notifications, messages (e.g., e-mails or SMS text messages), calendar data, received radiofrequency beacon messages, and so on.

The client device 110 is associated with a user 101. When the application 112 is installed, a user identifier for the user 101 can be determined. For example, on installation or afterward, the user 101 may log in using one or more credentials. The application 112 may then customize various aspects of the system for the user 101, including the trigger conditions used to detect an appropriate context for providing an information card as well as the type of content included in information cards.

In the example, the user 101 is a member of an organization, e.g., an employee of a company. The source database 122 represents database records stored by or for the organization. The records are not publicly available and are subject to data access restrictions, such as requirements that users be issued credentials from the organization that grant authorization to access the records. Different users may be granted different levels of authorization, and the server 120 enforces access restrictions so that each user is only allowed to access the subsets of information the user is authorized to access.

The system 100 improves techniques used to provide users with access to information in a more convenient and contextually relevant fashion. Information is presented through information cards that are displayed at specified points in time based on the satisfaction of context-based trigger conditions representing the relevance of specific topics or keywords to the activities of the client device 110. In this manner, the system 100 improves the relevance of information that is displayed to a user based on actions performed on the client device 110 and ensures that the displayed information is likely to represent information that is of interest to the user, at the time information is of interest to the user. Unlike many other systems, the user 101 does not need to manually submit a query or select from a list to obtain the information. Instead, the application 112 initiates display of the information as it detects that the information corresponds to the current context of the client device 110.

In FIG. 1, information cards are presented on the client device 110 as cards that include information obtained from the source database 122. The cards can include dynamically generated information so that they reflect changes to data stored in the source database 122. For example, the server 120 can store card templates 124 that identify, for example, the format and structure of the cards. The specific information that is displayed in the cards can be dynamically populated into the templates at the time the cards are determined to be relevant, so that each display of a card includes information generated from up-to-date information from the source database 122. Thus, if the same card for the same entity is displayed at different times, the content may be different for each instance of the card as the information in the source database 122 changes.

The card templates 124 can include different templates for different types of entities. For example, one template may be used for a person, another template may be used for a company, another template may be used for a location (e.g., a particular store or region), and so on. Different card templates 124 may also be defined and used for entities having different semantic relationships with the user 101, the user's organization, or others. For example, a first template may be used for companies that are customers, and may specify a first set of statistical measures to display in a card. A second template for suppliers may specify a different set of statistical measures to display in a card.

The system can also store card-specific information in card definition data 125 that specifies the parameters of individual cards. The card templates 124 can each represent characteristics of cards for a particular type of entity or class of entities, and the card definition data 125 can specify the particular card parameters for specific entities. Although cards for different entities of the same type may use the same card template 124, each individual card may have specific information that affects its content and presentation. For example, a card definition for a specific entity may include, e.g., an entity identifier, an identifier of the card template to be used for the entity, an indication of the keywords to be used to trigger presentation of the card for the entity, a mapping of data source elements to the components of the card template (if not already specified in the card templates 124), and so on. For example, a card definition for a company "Example Co." may specify that the "CARD_001A" template should be used, and that the specific set of keywords that trigger display of that company's card are "Example Co.," "Example," and "EC." The card definition data 125 can include a card definition record for each information card made available in the system, indicating which entities and keywords to the card templates 124. The card definition data 125 can also be used to customize (e.g., alter or override) aspects of the card templates.

Briefly, in the example of FIG. 1, the application 112 on the client device 110 detects a context-based condition, such as a keyword representing an entity having corresponding information in the database 122. The application 112 causes the client device 110 to request an information card, and the server 120 selects an appropriate information card, generates the information card, and sends data for the card back to the client device 110 for display. The example is explained in further detail below with respect to various stages labelled (A) through (E).

In stage (A), the application 112 monitors activity on the client device 110 to detect satisfaction of a trigger condition that specifies display of an information card on the client device 110. Trigger conditions can represent activity on the client device 110 indicating that the user 101 is likely to view or hear information.

The trigger conditions can be monitored passively without requiring the user 101 to provide input on the client device 110. For example, detection of an entity term in the text corresponding to an upcoming calendar appointment through a calendar application of the client device 110 can represent satisfaction of a trigger condition indicating that a user is likely to view information associated with the entity. In this example, the client device 110 monitors calendar data of the calendar application without the user 101 actively requesting the information, which reduces the number of user inputs required to display contextually-relevant information (i.e., information for an entity that is a participant to the calendar appointment).

In another example, the trigger condition can represent a location of the client device 110 being detected to be within threshold proximity (e.g., within 100 meters) of a conference center that is associated with information cards. In this example, the application 112 determines that the user 101 is likely to view conference information based on the location of the client device 110 and thereby determines that a trigger condition has been satisfied.

In some instances, the trigger conditions can represent action performed by the user on the client device 110 that relates to a particular entity or topic. For example, detection of message that includes a term corresponding to an entity can represent satisfaction of a trigger condition related to displaying information of the entity. In some other examples, the trigger condition can represent a search query received for an entity term, or some action performed on the client device 110 that indicates that the user 101 is requesting information, e.g., performing a web search through a browser application, performing a search using capabilities of the operating system (e.g., for an application, a file, etc.), among others.

In stage (B), the client device 110 transmits a card request 102 to the server 120. The card request 102 can indicates the term(s) identified as corresponding to an entity, or an indication of the entity determined to be relevant to the current context. Accordingly, the card request 102 may include monitored data collected at the client device 110, such as data indicating the trigger condition that was determined to be satisfied by the application 112. The card request 102 can also include an identifier for the user 101 and/or the client device 110. The identifiers can be used to customize the information that is displayed on the client device 110. For example, the organization managing the source database 122 can specify different levels of access to the source database 122 based on a user classification specified by a user or device identifier. In this manner, the system 100 can generate and display different information cards for users in response to satisfaction of the same trigger condition.

In stage (C), upon receiving the card request 102, the server 120 accesses the source database 122 and generates one or more information cards that are provided to the client device 110 in response to the card request 102. The server 120 generates information cards that are relevant to entity terms corresponding to the trigger condition detected in stage (A). For example, the server 120 can generate cards that include information for an entity that the client device 110 identified in text in a user interface of the client device 110, such as a calendar appointment, a text message, a search interface, etc., even though the text is found in a user interface of the operating system or an application different from the application 112. In some situations, the reference to the entity has been detected by the client device 110 in data that is not part of a user interface, such as the content of a notification, message, or record accessed by the client device 110. In this example, the selected information cards can include information corresponding to the entity in the source database 122.

The server 120 can also perform various text processing techniques in selecting cards to provide for output to the client device 110. For example, the server 120 identify terms included in a text message received by the client device 110 and determine if the text message includes keywords that are associated with information stored in the source database 122, or are associated with a card definition from among the card definitions 125. The server 120 can compare terms in the text message with keywords associated with the source database 122 to identify matching terms. When server 120 identifies one or more matches with the keywords associated with the keywords indicated in the card definition data 125, the server 120 generates the appropriate card(s) from the card definitions. In some scenarios where keywords match the keywords of multiple cards, e.g., information cards for two employees with the same name, the server 120 can provide all relevant cards, rank the cards based on applicability or affinity to the user 101, or alternatively, request the user to provide additional information to determine the correct entity.

Generating an information card can include determining that a keyword matching a particular information card definition record has been found. The matching card definition in the card definition data 125 can specify an entity identifier for a particular entity, a card template 124 for generating the card, and locations of information about the particular entity in an appropriate data source. The server 120 then generates the card using the layout and content types specified by the appropriate card template 124, with values being populated from the data sources used to define the card. For example, the attributes and metrics specified for fields or regions of a card template 124 can be populated with values for the particular entity as determined from the source database 122. Of course, different card templates and even different individual cards may derive their information from different data sources and even from combinations of data sources.

Information cards can be generated on-demand, in response to card requests as noted above. In addition, or as an alternative information cards can be generated (e.g., by populating entity-specific information into the card templates 124) predictively, in advance of requests for the cards, and then cached. The cached cards can be refreshed periodically, e.g., after a certain time has elapsed or if the underlying data affecting the content of a card has changed. As a result, cached cards 127 can be made available with very low latency.

In stage (D), the server 120 transmits an information card 104 for presentation on the client device 110. In stage (E), upon receiving the information card 104 from the server 120, the client device 110 presents the information card 104 for display on a user interface 126. The information card 104 can be presented in or with the current user interface of the client device 110, which may be outside the application 112. For example, the information card 104 may be provided through the operating system (OS) functionality of the client device 110 outside of the application 112, e.g., as an OS notification. In general, the information card 104 may be displayed in, alongside, or on (e.g., as an overlay to) the application or interface that has the term(s) that triggered the presentation of the information card 104, such as the current interface of the client device 110, whether the current application or interface is one for messaging, search, calendar management, and so on, or even a lock screen or home screen showing general system notifications. In some instances, the information card 104 can be presented through the application 112, e.g., as an application message, or a data object presented on a user interface of the application 112. The information card 104 can also be displayed in different formats, such as an image, an interactive control configured to initiate display of the information, e.g., a button that displays the information in response to receiving a user input.

In the example depicted in FIG. 1, the application 112 detects an upcoming calendar event for an upcoming meeting with an employee of the entity "Corporation A." The application 112 determines that a calendar event trigger condition has been satisfied based on processing calendar data of the client device 110 and determining that text corresponding to the calendar event references the entity. The server 120 receives the card request 102 from the client device 110 and selects a card template and specifies the generation of an information card 104 for a supplier "JOHN DOE" identified in the calendar appointment. The server 120 obtains information associated with "JOHN DOE" from the source database 122 in order to populate a card template with information about the particular entity that is relevant to the user 101.

As shown in FIG. 1, the information card 104 displayed on the user interface 126 includes information for "JOHN DOE," an employee of company that is a supplier for the company of the user 101. The server 120 selects information for this employee from the source database 122 since the calendar appointment detected by the application 112 identifies "JOHN DOE" in the text of the calendar appointment. In this example, the system 100 therefore processes calendar data to determine that the user 101 has an upcoming meeting with "JOHN DOE" and would benefit from receiving employee information prior to or during the meeting.

In some implementations, the system 100 can be configured to deliver information cards to the client device 110 based on processing activity or usage data collected on the client device 110 and determine times when an information card is to be relevant to actions being performed on the client device 110, such as the user writing an email, the user viewing a calendar appointment, or other scenarios where the user accesses data corresponding to entity-specific information. For example, the server 120 can collect usage data collected by the operating system of the client device 110 that indicates application usage times, time periods of frequent device usage, types of applications or webpages being accessed by the user, among other types of usage metrics. The server 120 can use pattern recognition techniques to process the usage data to predict points in time when certain information cards are likely to correspond to terms that are being accessed during actions being performed on the client device 110. As an example, if the usage data indicates that the user frequently reads articles between 7 AM and 8 AM every morning that reference certain business entities, then the server 120 can provide information cards that include information on stocks for the business entities to the user during that time frame. The server 120 can also adjust the content included in the information cards over time so that only information for entities that are often referenced in the articles read by the user are included in the information cards that are provided to the client device 110.

Additionally, the application 112 can configure the client device 110 to display data representing the information cards in a non-obtrusive manner. For example, the application 112 can provide an operating system notification on the client device 110 once the client device 110 has received an information card from the server 120 instead of redirecting the client device 110 to the information card and potentially disrupting the present activity being performed by the user. In some instances, information cards that are received by the client device 110 over a certain time period can be accumulated by the application 112. A reminder can then be sent to the client device 110 at a specified point in time that allows the user to access all accumulated information cards. For example, a reminder can be displayed on the client device 110 every morning, when then allows the user to view information cards received on the preceding day.

In some implementations, the system is capable of outputting information cards or data associated with information cards while a user accesses various applications running on the client device 110. In such implementations, the application 112 can run as a background process and monitor user activity on other applications to detect the satisfaction of trigger conditions. For example, if a user highlights or selects text that is displayed through a web browser application on the client device 110, the application 112 can detect that a trigger condition has been satisfied and the highlighted or selected text can be used as entity terms to identify and output information cards corresponding to the highlighted or selected text. In some instances, the user can be provided with a notification that indicates that relevant information cards are available for the highlighted or selected text, and upon selection, the user can be directed to the application 112 to access the information cards.

Additional techniques that can be used to generate, present, and use the information cards discussed herein are described in U.S. patent application Ser. No. 16/247,892, filed on Jan. 15, 2019, U.S. patent application Ser. No. 16/248,659, filed on Jan. 15, 2019, and U.S. Patent Application Ser. No. 62/802,047. The features and techniques of each of these applications can be combined in whole or in part, and in any combination or subcombination with the features and techniques discussed herein. These applications are incorporated by reference herein as noted in the cross-reference to related applications above.

Figure 1B:
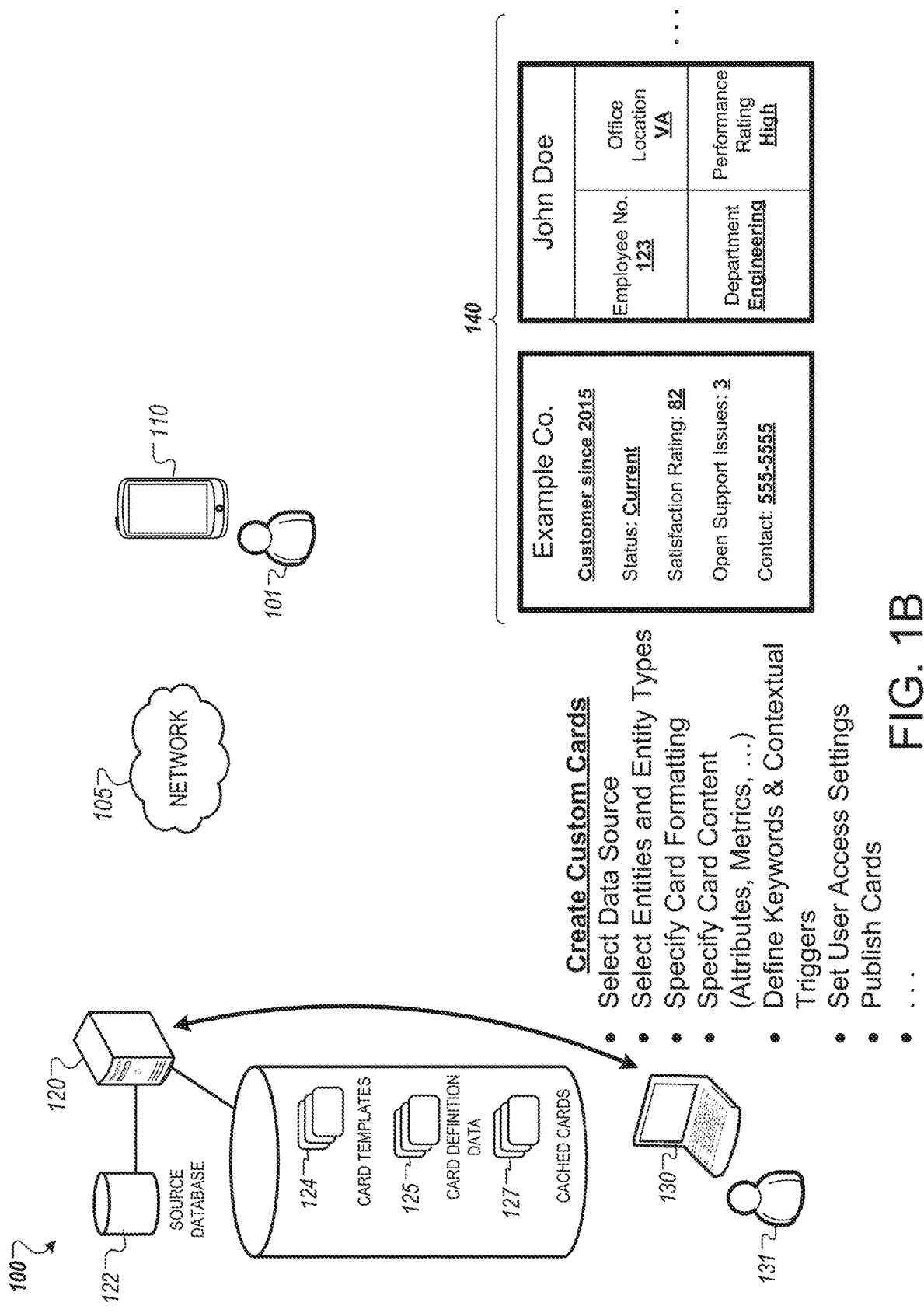

FIG. 1B shows that the system 100 enables an administrator user 131 to create and manage information cards using an administrator client device 130. The client device 130 interacts with the server 120 to provide user interfaces for the administrator 131 to design, manage and publish information cards for an enterprise or other organization. The administrator 131 can access a card creation user interface using the client device 130. The user interface can be provided by a webpage, a web application, a native application running on the client device 130, or other software.

From the user interface, the administrator 131 can create custom cards and specify both the content and behavior of the cards. For example, the administrator 131 may select a data source, which may be a specific data set or combination of data sets. From the information in the selected data source, the administrator 131 can specify entities and entity types for which cards should be created. The user interface can present indications of entities referenced in the data source, e.g., people, places, companies, and other entities. The administrator 131 can select a specific entity or an entity type to create a card for that entity or entity type.

The user interface includes controls that allow the administrator 131 to specify the layout and formatting for the card. This can include selecting a template that has regions or fields where data source elements can be inserted. To specify the content of the card, the administrator 131 can select attributes, metrics, or other information derived from the data set to insert into the regions or fields of the card being generated. For example, if the administrator 131 has selected a particular company as the entity for the card, the user interface can present a list of data elements that are available based on the content of the data set. For example, if the user has selected a particular company as the entity for the card, the user interface can present a list of data elements that are available based on the content of the data set, e.g., a location for the company, a number of employees of the company, revenue of the company, and industry for the company, and so on. These data elements may be specified directly in the data set, as a field or value of the data set, or may be derived from the data set using functions, equations, or other processing.

In some implementations, the user interface also shows related data that can be brought in from other data sources and incorporated into the card. For example, information about a company from an organization's internal database can be made available for inclusion, as well as suggestions of elements from other data sets that reference the same company. The server 120 can also find documents, such as reports and dashboards, that refer to the same entity as the card. The user interface can allow the user to include in the card hyperlinks or other controls to access these documents, so that users can quickly call up the information from an instance of the card.

In general, information cards can include a variety of interactive elements, including buttons, hyperlinks, sliders or filters, and so on that may enable a user to take an action, within the interface of the card or outside. For example, controls in a card may be selected to open documents, applications, or modules, or to initiate communication by starting a call or sending a message.

The user interface enables the administrator 131 to specify aspects of the behavior of the card being created. This includes setting keywords that, when present in the context of user's device, trigger presentation of the card. These keywords can include a name for the entity described by the card, nicknames and variations (such as abbreviations, acronyms, miss-spellings and so on), terms related to the content of the card, terms frequently used with references to the entity and other documents or in queries, etc. The server 120 may recommend keywords based on text that is associated with the entity in the data set used to generate the card.

The user interface enables the administrator 131 to specify contextual factors that can trigger presentation of interface enables the administrator 131 to set presentation of the card. These can include locations, times, the presents of devices or users nearby, and so on.

The user interface enables the administrator 131 to specify which users, applications, or other functionality can obtain the cards. For example, the administrator 131 can designate individual users or groups of users to receive the information card. In this case, only users so designated will be presented the card. As another example, the user interface can allow the administrator 131 to designate all users with a particular role or credential as recipients for the card. In a similar manner, the administrator 131 may specify that the card may be presented in a web browser through an extension, or through a mobile device in certain settings, such as in search results, on the messaging platform, based on calendar data, in response to detected locations, etc.

Once the card and its desired behavior are specified, the server 120 saves records of the cards, for example as card definition data 125 and/or card templates 124. The user interface enables the administrator to publish the cards, making them available to different users and devices.

Information cards and the data that defines them can be used for various purposes in addition to or instead of showing visual card presentations. For example, the elements defined for an information card can be used to generate audible, synthesized-speech outputs through a voice interface. For example, responses to voice queries from a user can be derived from the data in information cards. Similarly, the content of information cards can be used to identify common words and phrases for understanding users' voice requests as well as generating answers to those voice requests. As another example, the information from the information cards can be used in the process of generating customized natural language conversational agents (e.g., chat bots). Information about these techniques is provided in greater detail in U.S. Patent Application No. 62/802,047, and those techniques can be integrated in whole or in part with any or all of the techniques discussed herein.

The example of FIG. 1B shows examples of cards 140 that have been generated for different entities, a company "Example Co." and a person "John Doe." The information elements are linked to a respective data source, such as a data set or portion of the source database 122, so that changes in the values stored in the data source are propagated through to the different presentations of the cards 140, so that the presented cards reflect current information from the linked data source.

In some implementations, the server 120 can represent multiple servers that cooperate to generate and provide information cards. For example, completed cards can be published to a representational state transfer (REST) server. This server can make additions, get attributes, filter by attributes, generate HTML, and perform other functions. After being processed by the REST server, card data, reports, and underlying data sets (e.g., data cubes) can be cached in an intelligence server, which has the metadata for all of the cards that have been published. Later, when client devices retrieve cards, the intelligence server can provide a cached copy. In addition, client devices can predictively fetch and cache cards, based on prior usage patterns and/or analysis of a user's current tasks or data. These steps can significantly reduce the latency of the system in being able to detect the applicability of a card and present the card to a user.

Figure 2:
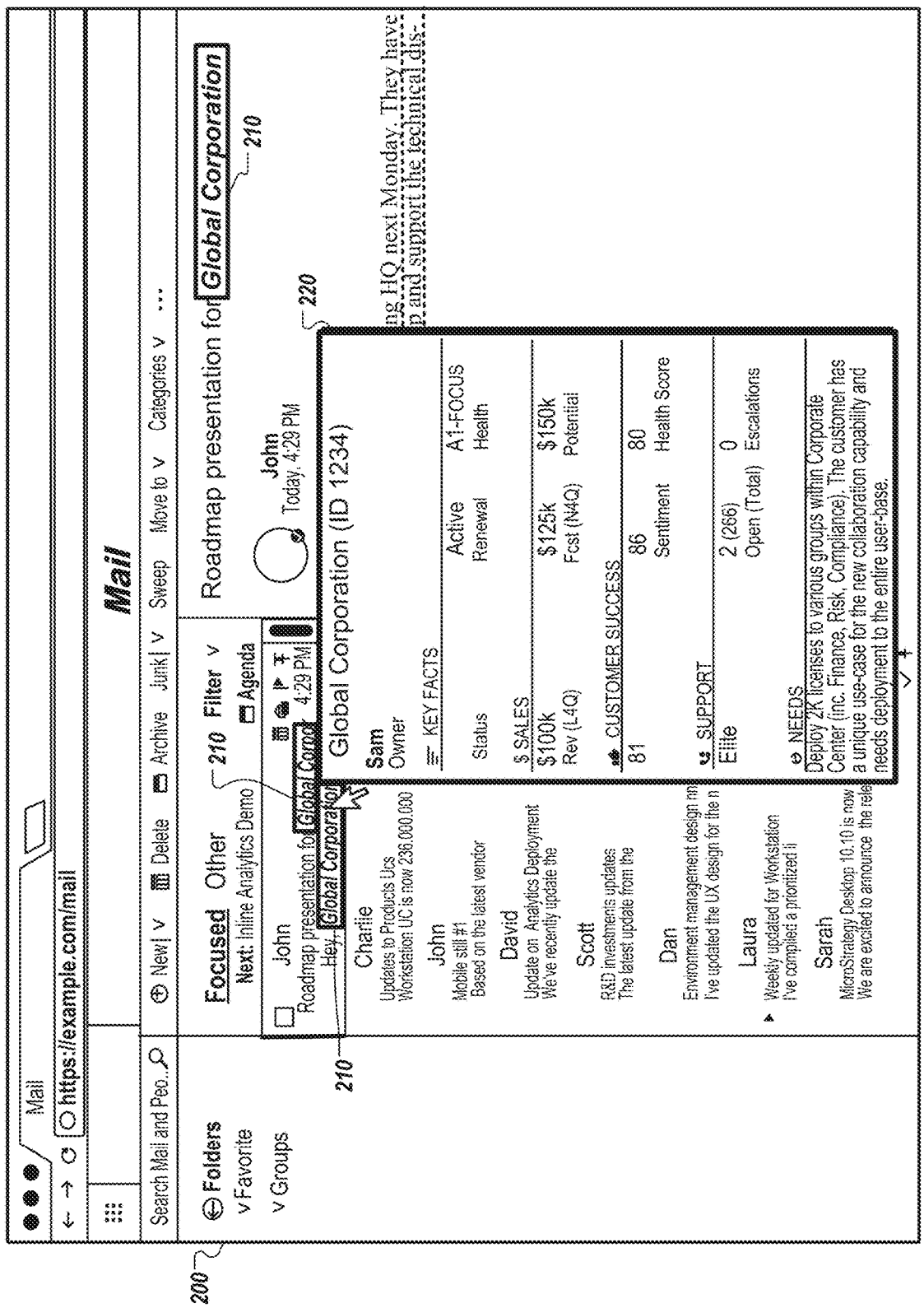
FIG. 2 is an example of a user interface for making information cards available on a client device.

FIG. 2 is a diagram illustrating an example of a user interface 200 showing an information card provided in response to user interaction. In the example, the user interface 200 is one that may be provided by a client device. The particular example illustrated shows a web browser and a web page providing information from a user's e-mail account. Upon navigating to the web page, the client device obtains the text content to be displayed, e.g., content of the web page, and checks the text content for matches with a set of key terms, e.g., words or phrases indicated by a server system or stored at the client device. As discussed above each of the key terms has corresponding information in a database. A key term may refer to a particular entity, and the entity can have a particular information card template associated with it.

In FIG. 2, after navigating to the web page shown in the user interface 300, the system has determined that the phrase "Global Corporation" is matches an entry in a list of key phrases. In response, the client device annotates each instance 310 of this term in the user interface 200, shown here by bold and italic formatting and a box around the term. Other types of annotations can be additionally or alternatively used. Each instance of the key term is also made interactive.

When the user interacts with an instance 210 of the key term, the client device generates and provides an information card 220 corresponding to an entity represented by the term. As illustrated, the interaction can be a mouse-over event where a cursor rests on or near the annotated term for at least a minimum amount of time. This interaction can trigger the client device to request an information card from a server system. The information card can include any of various types of information relating to the entity indicated by the key term, such as values from a database, statistics, visualizations, links to further information, quantitative or qualitative ratings related to the entity, and so on.

In some implementations, to allow the client device to obtain the data for the information card, the server system (1) maps an identified key term indicated by the client device to a specific entity, (2) selects an information card template corresponding to the specific entity or a type or classification of that entity, and (3) retrieves information from a database relating to the specific entity, according to the types of information specified by the selected information card template. The server system can then send the data for the information card to the client device for display. In some implementations, this process is done in substantially real time. For example, the server system can be tuned and can cache information about various entities so that the client device can obtain and display an information card less than a threshold amount of time after detecting the user interaction (e.g., 3 seconds, 1 second, 0.5 seconds, etc.).

In some implementations, a browser extension or other software agent on a client device cooperates with a server system to allows detection of appropriate contexts to make information cards available. As an example, first, a browser extension makes a REST API request to obtain the list of topic elements (e.g., keywords or other context identifiers) for one or more data sources. These can be obtained by the server from card metadata, such as identifying attributes specified by card templates 124 and extracting values for the attributes from the underlying data set(s) used to generate cards. The topic elements can also be specified in other card definition data 125, in metadata repositories, caches, and so on. Second, the browser extension caches the set of received topic elements. Third, the browser extension monitors content of browsed pages to determine if content of the page matches any of the cached topic elements. When a match is found, the browser extension highlights the matching term and makes the element interactive. Fourth, the browser extension receives data indicating user interaction with the highlighted term, such as a hover over the highlighted term. Fifth, the browser extension makes a REST API call to get the data corresponding to the highlighted element from the source data set for the appropriate card matching the highlighted term. The server provides content, such as HTML data, that provides the content for the card. Fifth, the extension renders and displays the card based on the received data. Many variations are possible, however, including the pre-loading of card content on the client in response to finding topic elements in a page, before a user interacts with the highlighted term.

The additional techniques in U.S. patent application Ser. Nos. 16/247,892, 16/248,659, and 62/802,047 can also be used for obtaining, presenting, and otherwise using the information cards discussed in this document. Similarly, the systems, processes, and information cards discussed in this document can have properties as discussed in U.S. patent application Ser. Nos. 16/247,892, 16/248,659, and 62/802,047.

Figure 3:
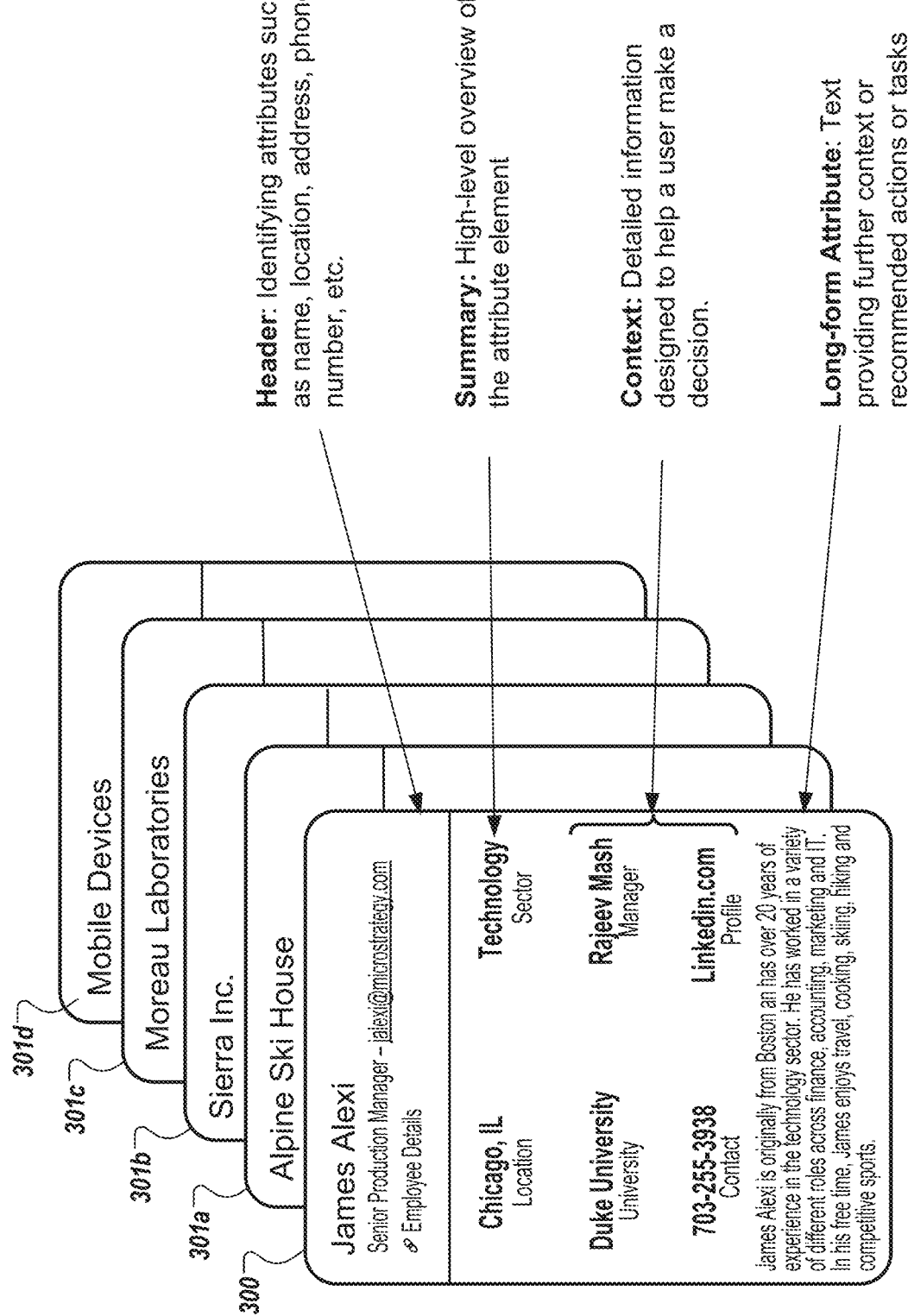
FIG. 3 is a diagram illustrating an example of an information card.

FIG. 3 shows an additional example of an information card 300. The content and style of information cards can vary from one organization to another, from one entity type to another entity type, and for different entities. Other information cards 301a-301d can be defined in a similar manner.

As illustrated, the card 300 can include a header, which can include identifying attributes such as a name, a location, and address, phone number, and so on. The header may also include interactive elements such as a link to a web page for the entity, a link to initiate sending a message, a control to access one or more documents or database records corresponding to the entity, and so on In some implementations, the main body of the information card includes various indicators, such as values for attributes and metrics, text, visualizations, or other elements derived from one or more data sets. As noted above, these values may be derived from private data sets, but are not limited to information from private data sets. The indicators may include summary elements, as well as context information. In some cases, at least some of the attributes provided as indicators are tailored to the needs of a specific task or role. For example, a card for presentation to a customer service agent may include information to help the agent quickly identify outstanding issues and initiate communication to address them. Information cards may include text, such as a long-form attribute that includes notes, recommended actions, tasks, and other information.

Cards may be defined in terms of attributes or other data elements in an analytics platform. One card can be defined for an entity type or object type, using the attributes of that entity type or object type. For example, in the card shown in FIG. 3, the card for an employee can specify a location attribute, a sector attribute, university attribute, a manager attribute, a contact phone number attribute, and a profile link attribute. After this entity type card has been defined, each time an instance of an employee identifier is found, e.g., in on screen content, and metadata, or in other device context, the entity type card can be used to generate a card for the applicable employee, by populating values for the attributes from one or more data sources.

Figure 4:
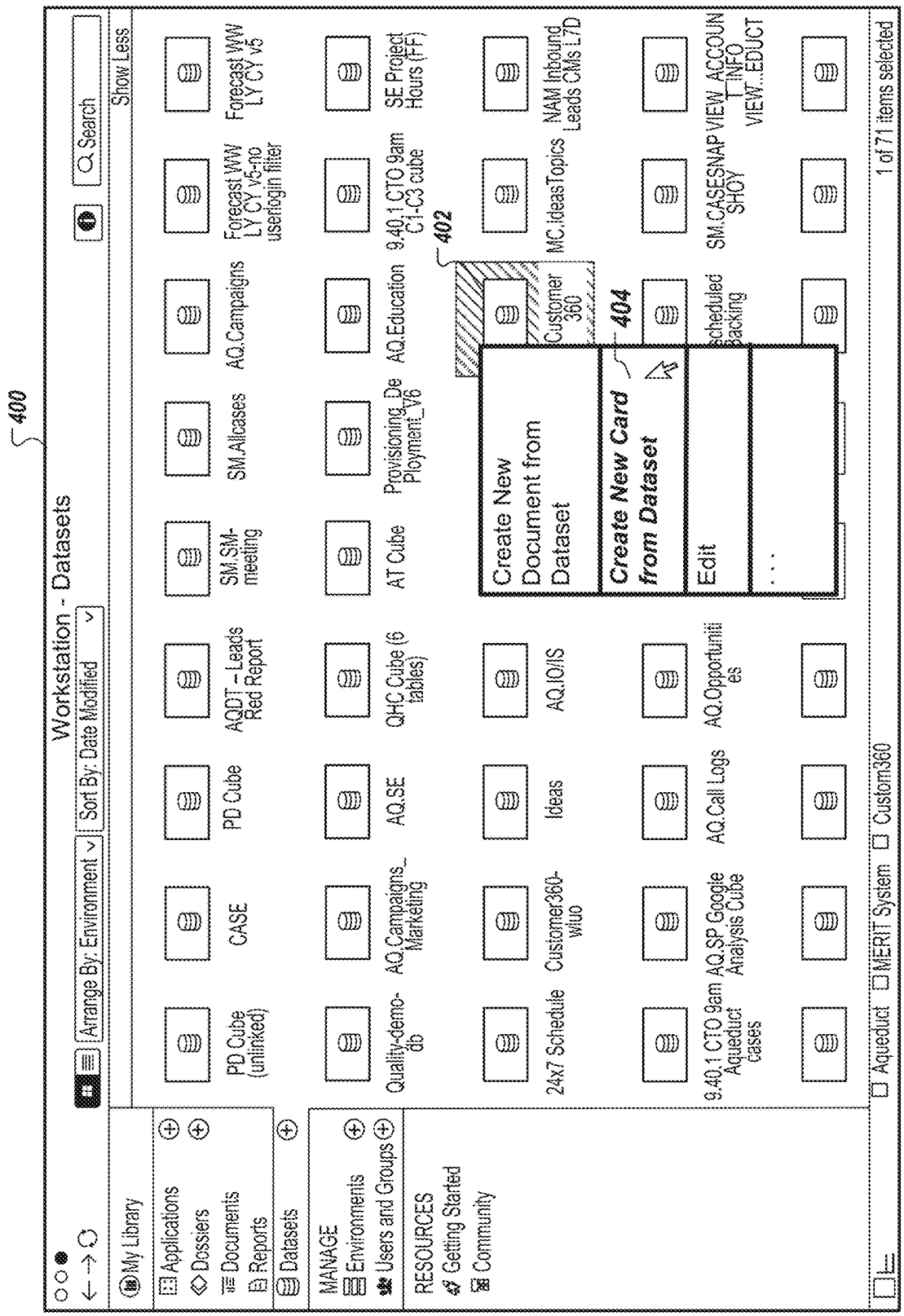
FIGS. 4-6 are diagrams showing user interfaces for creating and managing information cards.

FIG. 4 shows a user interface 400 of a client device, such as client device 130 from FIG. 1B, which can be used to initiate the creation of a new card from a data set. The user interface 400 shows various data sets that are available in an analytics platform.

The process of creating an information card can include a user importing, identifying, selecting, or otherwise accessing a dataset. This can be done through any interface or gateway of an analytics platform. As an example, a user may create or access a data cube (e.g., an online analytical processing cube) or other data set. The user can select the data set and interact with control to begin creating an information card from the cube. In some cases, this can be as simple as a "right-click" or hover over an icon representing the data set, and selecting an option for creating a card, such as an item "create a card" or "publish to extensions" from a context menu that appears. The indication that a card should be made can cause the system to provide a card creation user interface that shows properties of the data set, such as a list of attributes, metrics, entities, or other elements referenced in the data set.

In the example of FIG. 4, a user selects one of the data sets, for example by right-clicking on an icon 402 for the data set, and in response the system shows a context menu with various options. One of those options is item 404, an option to create a new card from the data set. Selecting this option causes the system to provide the user interface shown in FIG. 5.

Figure 5:
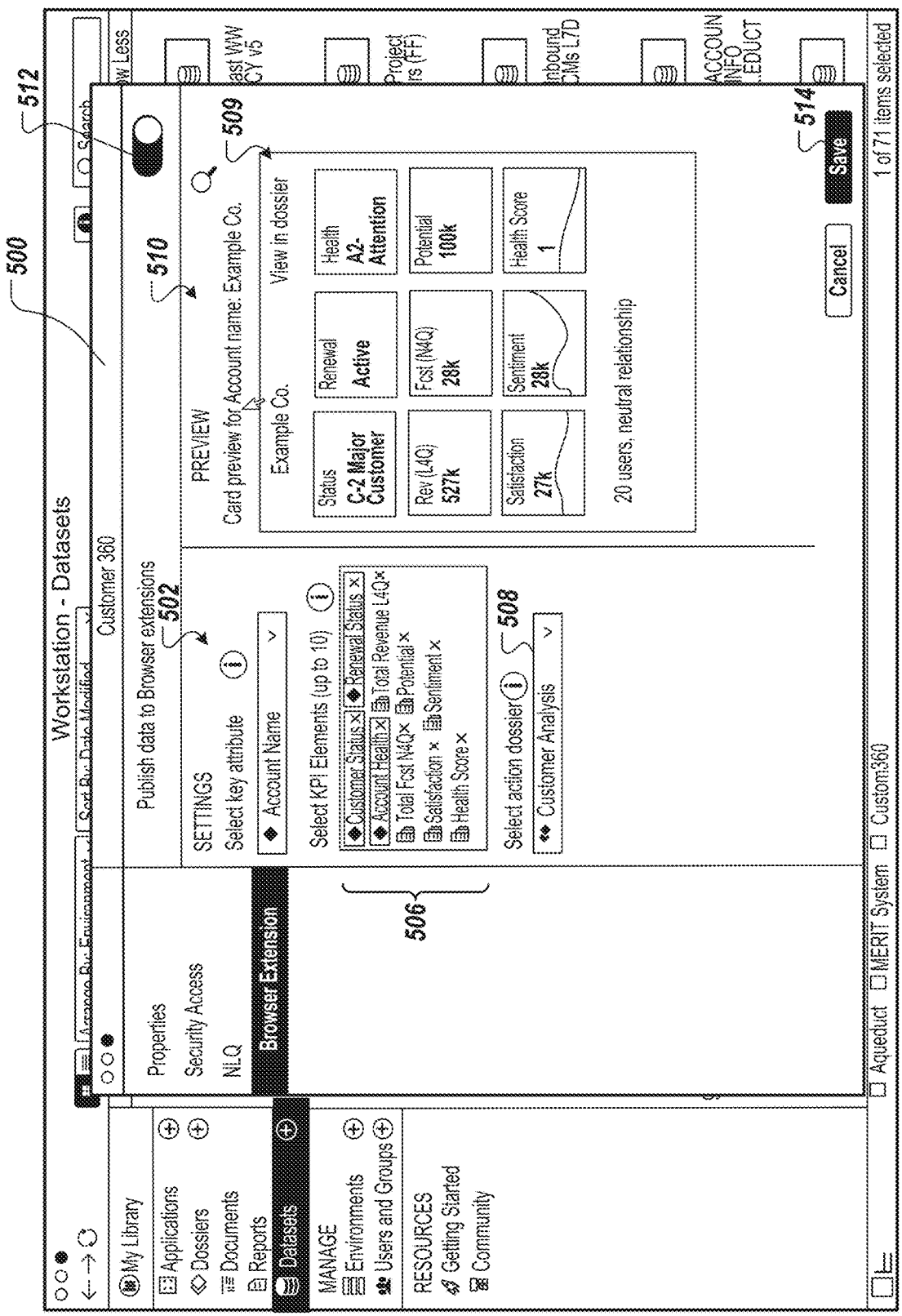

FIG. 5 shows a card creation interface 500 that allows the user to define the content and characteristics of a card. The card creation user interface 500 can include a settings pane 502 showing elements of the data set, as well as a preview pane 510 that previews how the card will look and can be manipulated to place and organize elements to be displayed in the card.

The user interface 500 displays data elements from the data set that can be used to define the card. These are shown in a settings pane 502. One of the data elements can be designated as a key attribute, for example, by selection from a list using a drop-down menu 502. The key attribute can specify the main entity type for object type that the card will represent. In the example, a key attribute of "account name" is selected, and as a result, the card being generated will be used to create individual cards for different accounts. As another example, selection of "employee name" as the key attribute could be used to generate a card for different employees in the data set. The key attribute may be used to define elements of the card's header, such as the name or title of the card, and one or more initial keywords for triggering presentation of the card.

Once the key attribute is selected, the system populates a set of data elements 506, e.g., attributes and metrics shown as "KPI elements," that are related to the selected key attribute in the data set. These data elements 506 can represent the types of data available in the data set for the objects of the type indicated by the key attribute. Each data element 506 may represent, for example, a column from a data cube or table. Data elements 506 may also represent the results of applying different functions or aggregations to a data set, e.g., computing a mean, maximum, minimum, or other measure based on the data set that the user selected in FIG. 4. The user can select from these data elements 506 to add them to the card. For example, the user may drag and drop the data elements 506 onto locations on a preview pane 510. As another example, the user may simply select desired data elements 506, in the system may arrange them.

The settings pane 502 includes a control 508 that enables a user to select a document to link to the card. The selected document can be indicated in the card, with a hyperlink or other control 509 that user can select to initiate opening of the selected document.

On the right hand side of the user interface 500, the preview pane 510 shows an example card presentation based on the current selections and settings from the user. Although the card format being defined will be used for each of the different accounts in the data set, the preview pane here shows and example card populated for a specific account, the account of "Example Co." This allows the user to see the effects of changes and selections in real time as parameters of the card are adjusted. As shown in the example, each individual indicator can include a value for an attribute as well as a label or attribute name. For example, the indicator in the upper left corner includes the attribute label "status" and a value "C2—Major Customer." In some cases, other information is provided in addition to or instead of indicator values in text or numeric form. For example, indicators may be represented with colors, icons, animations, images, charts, graphs, and so on. In FIG. 5, the indicators in the bottom row each have a line that indicates how the attributes have changed over a period of time. This effectively includes a graph in the indicator area to show a progression over a period of time (e.g., one month, three months, 1 year, etc.) as well as including the current value for the indicator.

The user interface 500 or another user interface can include controls to allow or restrict access to the generated card. For example, a control 512 can set whether to automatically publish the new card to user devices through browser extensions. Similar controls can be included for making cards available through other functionality, such as location-based presentation, e-mail applications, calendar applications, search functionality, messaging platforms, and so on. In addition, user interface controls can be provided to allow the user to specify specific users or user groups that can receive the current card type or, more generally, cards based on the current data set.

After the card is completed, the user can select a control 514 to save the card. From the selections on the interface 500, the system will save the card information to allow multiple cards that can be presented—not just a single card for the "Example Co." account, but a displayable card element for each unique value in the data set for the "Account Name" key attribute. As a result, if there are 20 accounts in the data set, saving the card format can allow the defined type of card to be displayed for any and all of the 20 different accounts. Of course, additional interfaces can be provided if desired to customize or adjust individual cards in addition to or instead of adjusting cards as a group.

To facilitate card generation, the system can make available standardized templates that a user can select to apply predetermined combinations of layout and formatting attributes. For example, a template may provide a three-by-three grid of containers, each configured to provide a metric or attribute, so the user can add 9 different data elements. The template can also include other elements such as a header region, a footer region, a title, etc. which can also be populated and customized. Of course, the interface can include controls allowing a user to set or adjust layout and formatting as well. The interface can enable a user to select elements of the data set and assign positions for the selected data elements to be displayed. For example, the interface can enable a user to drag data set elements (e.g., attributes, metrics, etc.) and drop the elements into specific fields or containers of a card template. Doing so can create links between the card and specific portions or elements of the data set, which can be used in an ongoing manner to refresh the content of the card from the current values in the data set.

When adding an element from the data set, the system can automatically configure properties of the card based on the characteristics of the data set. For example, when a user drags an attribute from a data set to a region of the card template, the system can identify a data type for the attribute value (e.g., text, integer, unit of time, dollar amount, geographical location, etc.) and apply formatting for that data type. The system can also look up a human-readable name or explanation for the attribute type, e.g., determining and adding to the card a "Number of Employees:" descriptor for the attribute value if the attribute represents a number of employees. In addition, the system can identify a record or portion of the data set representing that attribute. If the card being generated is for a specific company and the attribute is number of employees, for example, the system can identify and store, in card definition data, a field or set of records used to determine the value of the attribute from the data set for that specific company. In general, the card generation process creates mappings between elements of the card (e.g., portions of the card, or fields of a card template) with portions of the data set.

In some implementations, each information card can be created individually. For example, the process of creating cards can be done for each individual entity, e.g., a first card is created for "Company 1" with a first, custom subset of attributes and metrics included in the card; a second card is created for "Company 2," with second, different custom subset of attributes included in the card; and so on.

In some implementations, cards can be generated in groups or batches, for example, linked to a master card definition or card template that specifies card content types and not only general formatting and layout. This can speed the process of creating cards and can increase efficiency. For example, the system may create one generic entity type card for object type "employee." This entity type card can be used to provide card presentations for all objects of the "employee" type, with the card presentation for a specific employee having card content and metadata (e.g., keywords for triggering) populated from the attribute values for the specific employee.

As an example, the interface can enable a user to create a card representing an entity type (e.g., a supplier company, a customer company, an employee, a person, etc.), and provide indications of the data elements available for entities of that entity type. Once the template or generic entity type card for the entity type is specified by the user, the system can use it to create cards for any entity of the entity type that is in the data set. This can enable many cards to be created quickly, and with uniformity in the content of the cards (e.g., with the same or similar subsets of attributes and metrics for entities of the same type). The system may derive, from the template or generic entity type card, a specific card definition for each entity of the entity type. The individually-defined cards can then be separately customized and edited further, since even for entities of the same type different individual entities may have differing types of information that is most relevant. This can include creating separate card definitions for each entity's card, and specifying in those cards the links to the data set needed to populate each card with the corresponding entity's data. In some implementations, a user may create a card for a single instance of an entity type, and then select to apply the characteristics of that card to other instances of the same entity type. For example, a user may create a card for a first company, then extend the card definition (e.g., the selection of attributes and metrics, the organization and formatting, etc.) to all other companies described in the data set, thus creating a card of the same type for each of the companies. In other implementations, a template or generic entity type card can be stored and can be used repeatedly to dynamically create cards for entities of a particular type, without storing separate individual card definitions for individual entities.

The information cards can include embedded rules or conditions that may vary the content or presentation of the cards based on different conditions. For example, the inclusion of certain content or the formatting of content can be conditional. Thresholds can be set for an attribute or metric, and if the value meets predetermined criteria (e.g., inside or outside of a certain range), that attribute may be highlighted or otherwise emphasized. Rules or conditions defined for a card can also be used to personalize the card for different types of end users. For example, the rules may specify that one attribute is shown for users in one department and a different attribute is shown instead for users in a second department.

The system may use machine learning to automatically generate cards or to suggest content for cards. In some cases, the system can predictively suggest cards to be generated and content for the cards (e.g., subsets of attributes and metrics that are most commonly used). For example, the system can access usage data indicating, for example, rates of co-occurrence of different terms in documents of an organization, query histories from users of the organization, counts of interactions with different elements of documents, time spent viewing or interacting with different documents, and so on. From this usage data, the system may infer which entities referenced in a data set are most significant as well as which attributes and metrics are most often used with those entities or entities of the same types. The system can then recommend the creation of cards for the identified entities, and can recommend that the most commonly used attributes and metrics be presented in the cards. As users view cards and interact with the cards, the system can record further usage information that the system can use to alter the content of cards and to provide better recommendations in the future.

As noted above, each card can be designed with one or more key terms (e.g., words, phrases, numbers, data points, patterns, etc. referred to generally as "keywords" herein) specified for the card, so that the occurrence of the one or more keywords can trigger the presentation of the card. Users may manually enter these keywords, select them from values taken from the data set linked to the card, or enter them in other ways. In some implementations, the keywords are values corresponding to attributes associated with a card. The system may suggest keywords to the user for inclusion as well, based on characteristics of the data set and other cards. The card creation user interface can provide information about an attribute of an entity as well as synonyms. For example, a user may define a card for a person, and specify that the card title (e.g., a primary key) is the person's name (e.g., a "name" attribute from the data set). This selection can also cause the system to import other attributes as keywords to trigger presentation, such as an "initials" attribute in the data set, a "nickname" attribute, and others, and link these attributes with the same card. The values of all of these attributes can be set as keywords that can be used to trigger presentation of the card. In some cases, the related attributes may be taken from a data set different from the data cube or other data set that a user selects as the basis for the card. For example, the system can use an entity identifier from the data cube or even as manually specified by the user creating the card to retrieve other information from a different data source, which can be added to the user interface and used to define the card.

The keywords for a card may or may not appear visibly in the card. For example, the name of an entity may appear in the card, and the name may be a keyword for the card. In addition, any of the other values in the card may also be potentially used as keywords for the card, automatically or through manual selection of the card's creator. As a result, keywords are not required to match only to the name or primary attribute for a card. As an example, a card for a person may include the name of a company the person works for as an attribute derived from a data source and displayed in the card. Similarly, the occurrence of a keyword that triggers display of the card may or may not include display of the keyword on a display of a client device. In many instances, at least some keywords that can trigger presentation of a card are not displayed in the card and instead are stored in metadata.

In some implementations, cards are designed with specified conditions for presentation instead of, in addition to, and/or in combination with keywords. For example, each card can have metadata, such as hidden fields or associated parameters that are not visually displayed in the card but are stored and evaluated by the system. This metadata can specify contextual attributes that specify when a card should be displayed or otherwise made available. These contextual attributes can include locations, times, the presence of certain devices or users (or devices or users of certain types or classifications), the occurrence of an event related to an entity, an attribute or metric for the entity meeting particular thresholds or having a particular status (whether the attribute or metric is shown in the card or not), and so on. With these contextual attributes defined, a card can be automatically presented or made available when, for example, a user's device is near any person from a specific department, when the user's device is near a specific person, or when the user's device is in a specific geographical area or in a specific type of geographical area (e.g., within a retail store). There can be multiple different contexts or conditions that each separately trigger displaying of a card, and each context may be defined in terms of multiple contextual attributes (e.g., time, location, conditions or thresholds for data about the organization being met, etc.).

These contextual triggers defined for cards can be especially helpful for use with mobile devices. Some attributes or contextual factors may be focused specifically on use cases for mobile devices. As an example, a card may have embedded metadata of location (e.g., a GPS coordinate or other location data) so that the mobile device receiving the card knows the location corresponding to the card. The mobile device then can move from place to place, and if the mobile device detects that it is within a particular range of the specified location can surface the card for the location.

A mobile device can periodically refresh the set of cards it stores based on its current location, so that the mobile device had available the set of cards applicable for nearby locations. In some cases, the system or a user defines a radius of interest (e.g., a 10-mile radius). When an application on the mobile device is opened, the mobile device will download and cache various points of interest cards. The mobile device compares its location to the locations for the cards, and when it detects sufficient proximity to one of the locations, the mobile device presents the corresponding card. As an alternative, a mobile device can send data indicating its location to a server, which can then determine that the mobile device is near the location corresponding to one of the cards and send the card to the mobile device for presentation.

When a user creates a card, the card is linked to the data source(s) that the user selected, such as a specific data cube. As a result of this linkage, data security and access control for the underlying data source(s) flow through to the content of the card. Access restrictions are enforced for each user, each card, and each time the card is displayed. By applying identity-based or object-level security policies, if a user is not authorized to access data for any of the different information elements within the card, the system will generate the card to show a dash, a blank area, or other indication that the data is not available. This allows for control of security at a fine-grained level.

In some implementations, different cards may be created for different user roles or different groups of users. For example, for a given company, a different card or card template may be used to generate cards shown to users in an engineering department than have different content (e.g., show different attributes and metrics) than cards shown to users in the finance department. When multiple cards are available, the different cards can be targeted to different users based on, for example, a user's role, interests, user profile, usage history, and so on.

Cards that are created can be published to allow access to specific users and sets of users. For example, the system may provide an interface that identifies users and available cards, and that allows an administrator to manually add or remove users from an access list. This can be done for individual users and with respect to individual cards or at a higher level of aggregation. For example, the system may group cards by entity type (e.g., supplier company, customer company, location, etc.), by author, by data source, by keyword or subject matter, by types of metrics and attributes included, and so on. Similarly, the system may group users by user type, role, location, access privileges or credential type, department in an organization, similarity in usage patterns, and so on. The interface to the system may indicate one or more of these different aggregations of cards and users, and can provide controls that allow an administrator to select a card or group of cards to be made available for a group of users. The system can also certify card content (e.g., with certificates, signatures, etc.) to indicate the information is trusted, and can verify the certification on presentation to ensure that only legitimate content appropriate for the user is provided by the system.

Figure 6:
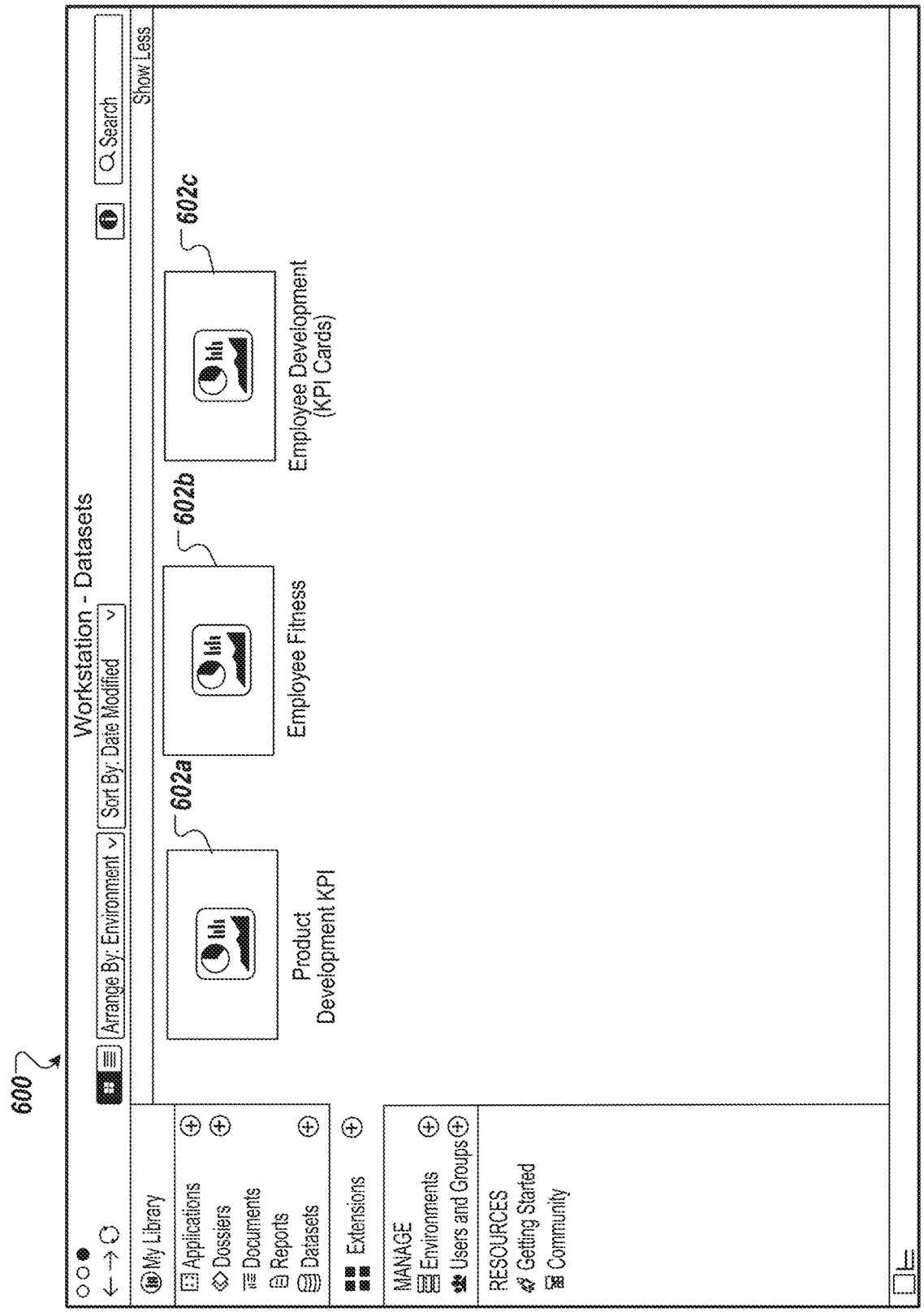

FIG. 6 shows a user interface 600 that the system can provide to allow management of created cards. The user interface 600 can provide a central interface to author and manage all embedded and extended content. The interface 600 shows objects 602a-602c, each of which represent a card or collection of cards. From this interface 600, the user can drag and drop cards to different computing environments to make them available on different servers and to different sets of users. The user interface can also allow the user to set access control restrictions, assign cards to specific users or user groups, adjust the keywords or contextual factors for presentation of cards, and adjust other parameters of the cards. In addition, the interface 600 may include controls that adjust how the cards 602a-602c are managed by the server and client devices, such as to specific whether and to what extent a card or its underlying data set should be cached at the server or client devices, a frequency that cached data should be refreshed, and so on.

Figure 7A:
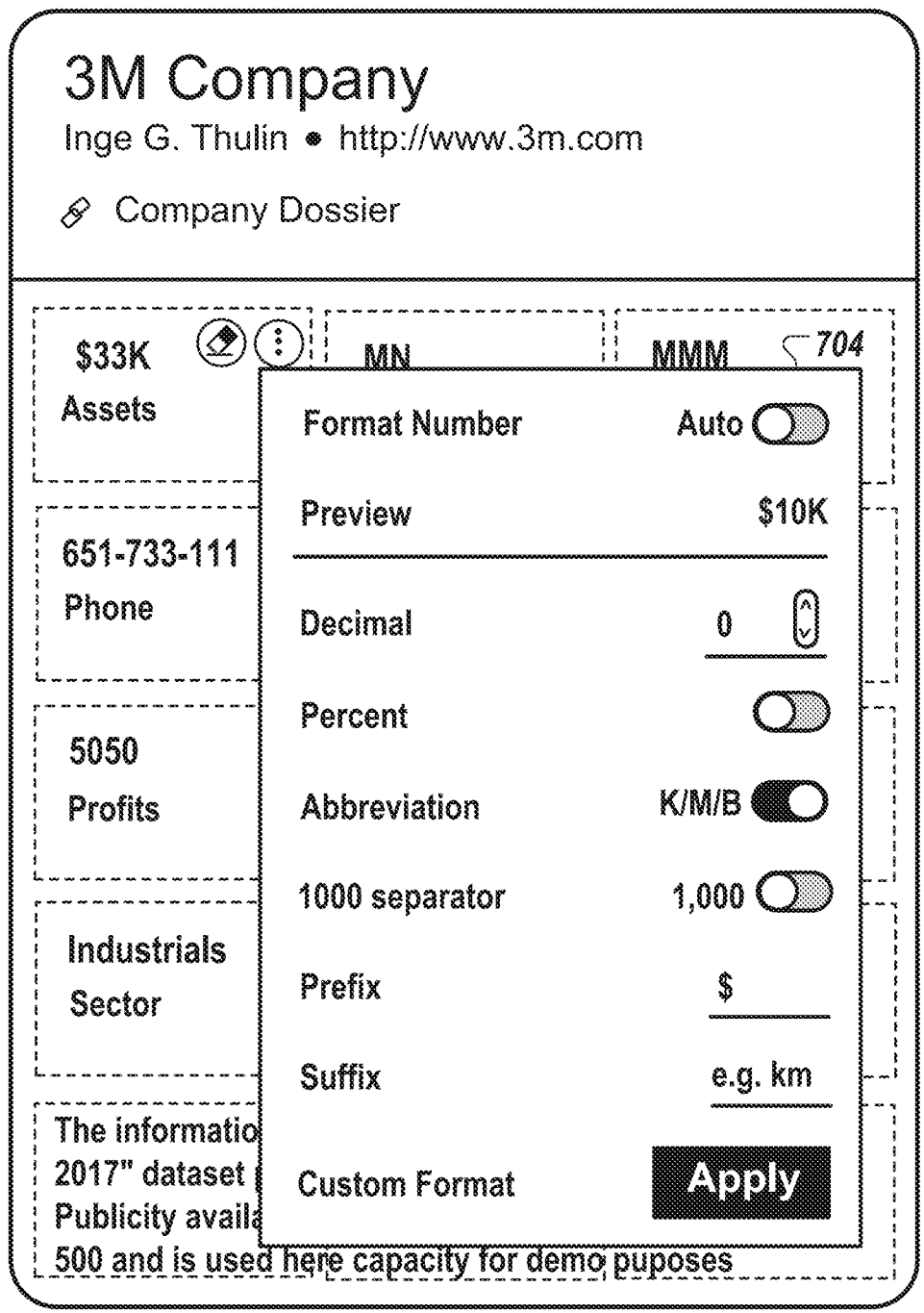

FIG. 7A shows an example of a card 700 being generated or edited. The card includes several regions for the placement of indicators (e.g., attributes, metrics, etc.), with the various regions being designated with dashed lines. A first region 702 represents an "Assets" element, and a user has selected a control in the region 702 to edit the formatting or display properties. This interaction caused an overlay panel 704 to be displayed, with various controls for adjusting how the data values for the attribute will be displayed. Options include setting the number of digits, including abbreviations, punctuation, a prefix, a suffix, and so on. The content of the overlay panel for an indicator can vary based on the data type of an attribute value as well as metadata from the data set from which the attribute is derived. In addition to the adjustments shown on the panel 704, the contents of the different regions 702 can altered, for example, the indicator specified can be deleted, replaced with a different indicator, can be expanded or restricted to cover a different time range, and so on.

FIG. 7B shows another example of a card 710 being generated or edited. The interface shows a panel 712 that allows an interactive control, such as a hyperlink, to be added and edited, to provide access to other content within or outside the analytics platform.

Figure 8:
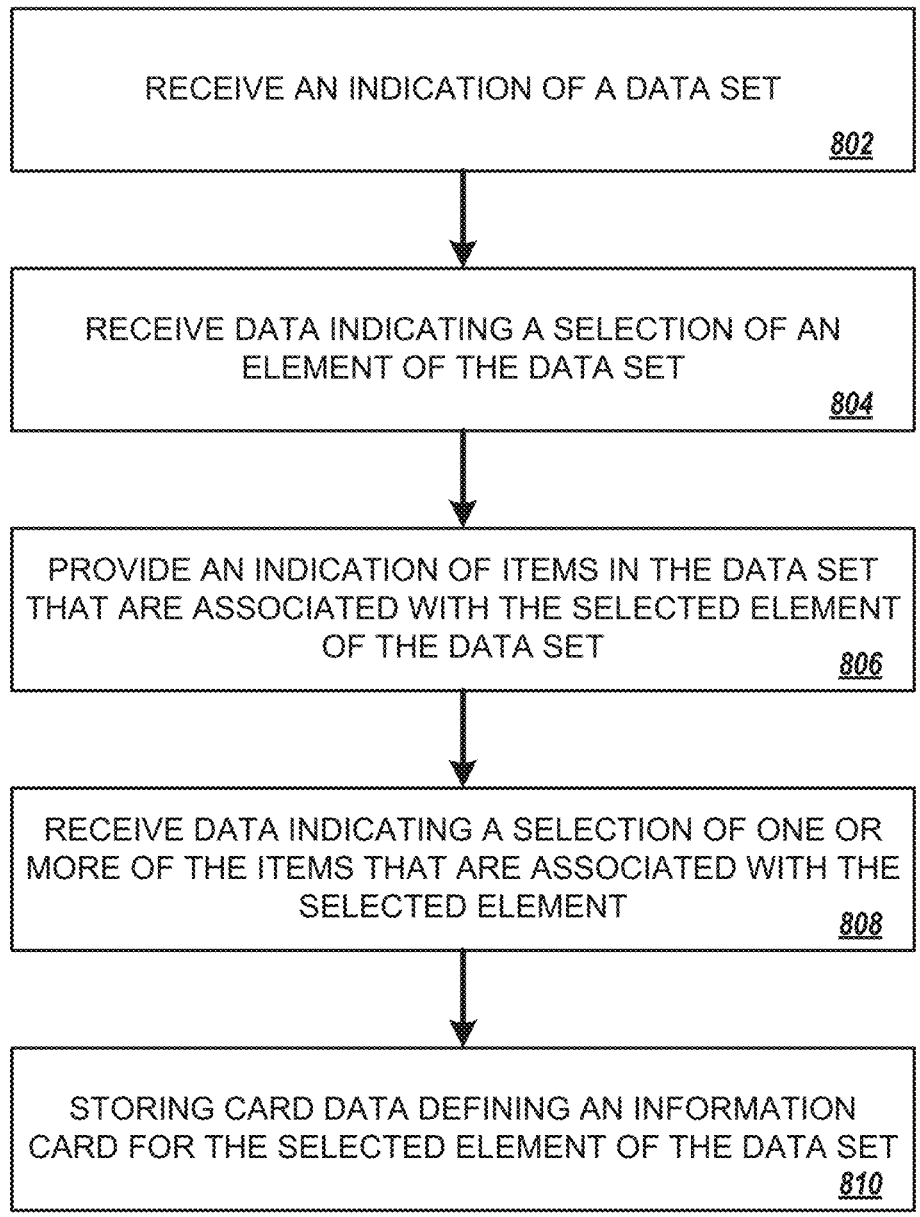
FIG. 8 is a flow diagram that illustrates an example of a method for generating and presenting information cards.

FIG. 8 is a flow diagram that illustrates an example of a method 800 for generating and presenting information cards. The method 800 can be performed by one or more computers, for example, the server 120 discussed above.

The one or more computers receive an indication of a data set (802). For example, the indication of a data set can be a selection of the data set by a user. A user may select a data set or file using a user interface. The data set can be a data cube, a database, or a collection one or more data files.

The one or more computers receive data indicating a selection of an element of the data set (804). For example, an element of the data set can be selected, for example, an entity such as a person, place, company, product, device, etc. In some implementations, the selection of the element is made by a user. In some implementations, the selection of the element is made by a machine learning module.

The one or more computers provide an indication of items in the data set that are associated with the selected element of the data set (806). For example, the items can be attributes or metrics of the data set. An attribute can refer to an entity, concept, or object, such as a product, employee, month, and so on. Attributes can be data fields or descriptive entries or values for a subject. For a person, an attribute could be, for example, a name, address, phone number, education level, user name, job title, etc. In some cases, an attribute can refer to a static value in data field or a label. A metric can be a measure or key performance indicator. For a company, examples include revenue, profit, employee headcount, and probability of purchase. From a practical perspective, metrics are the calculations performed on data stored in a data set, the results of which are displayed or used in other ways.

Accordingly, a metric can refer to a calculated value or the result of evaluating expression that is based at least in part on records in the data set.

The one or more computers receive data indicating a selection of one or more of the items that are associated with the selected element of the data set (808). In some implementations, the selection of the one or more items is made by a user. In some implementations, the selection of the one or more items is made by a machine learning module. The machine learning module can be one that has been trained to identify data items that are most commonly used (e.g., requested, viewed, copied, shared, etc.) by a set of users, such as users in a group, department, organization, or geographical area. Based on access logs and/or other usage records showing how portions of the data set and/or other data sets have been used, the machine learning model can be trained to identify the data items with the strongest affinity to a data element. Given characteristics of a data element, such as an element type (e.g., person, location, device, etc.) and other characteristics of the data element, the trained machine learning model can provide output indicating a relative importance of various data item types, and the items given the highest importance scores can be selected for inclusion in the information card. In some implementations, selections by the machine learning model can be presented on a user interface and then confirmed or altered by a user.

The one or more computers store card data defining an information card for the selected element of the data set (810). The card data can indicate (i) data indicating the selected one or more items (e.g., attributes or metrics), and (ii) a reference to the data set. The card data can be card definition data that specifies the content of an information card to be displayed for an entity, such as an entity represented by the element of the data set. The card data can specify the type of content, e.g., the types of measures or indicators to be included in the information card when it is generated. The reference to the data set is configured such that generating the information card based on the card data causes values for the selected one or more items to be derived from the data set and included for presentation in the information card. The reference to the data set can be configured so that a device generating or presenting an information card based on the card data can refer to the data set and obtain current information to populate the card, e.g., by retrieving or calculating up-to-date values based on the current contents of the data set at the time the information card is presented. For example, the reference can be a link, file name, universal resource indicator (URI), etc. The card data can include presentation data indicating a layout or formatting for the selected one or more of items. The card data can include an indication of a user or group of users authorized to receive the information card.

The card data can also indicate triggers and/or conditions that may cause the information card to be displayed. For example, the card data can indicate a first element of the data set designated for triggering display of the information card. The one or more computers can later obtain data indicating a term corresponding to a context of a device, determine that the term matches at least one value for the first element of the data set, and in response to determining that the term matches at least one value for the first element of the data set, provide the information card for display by the device.

In some implementations, the selection of an element of the data set includes a selection of a particular attribute in the data set, wherein the data set includes multiple different values for the particular attribute. The card data enables generation of an information card instance for each of the different values for the particular attribute, the information card instances respectively having the selected one or more items populated with values corresponding to the different values for the particular attribute.

Figure 9:
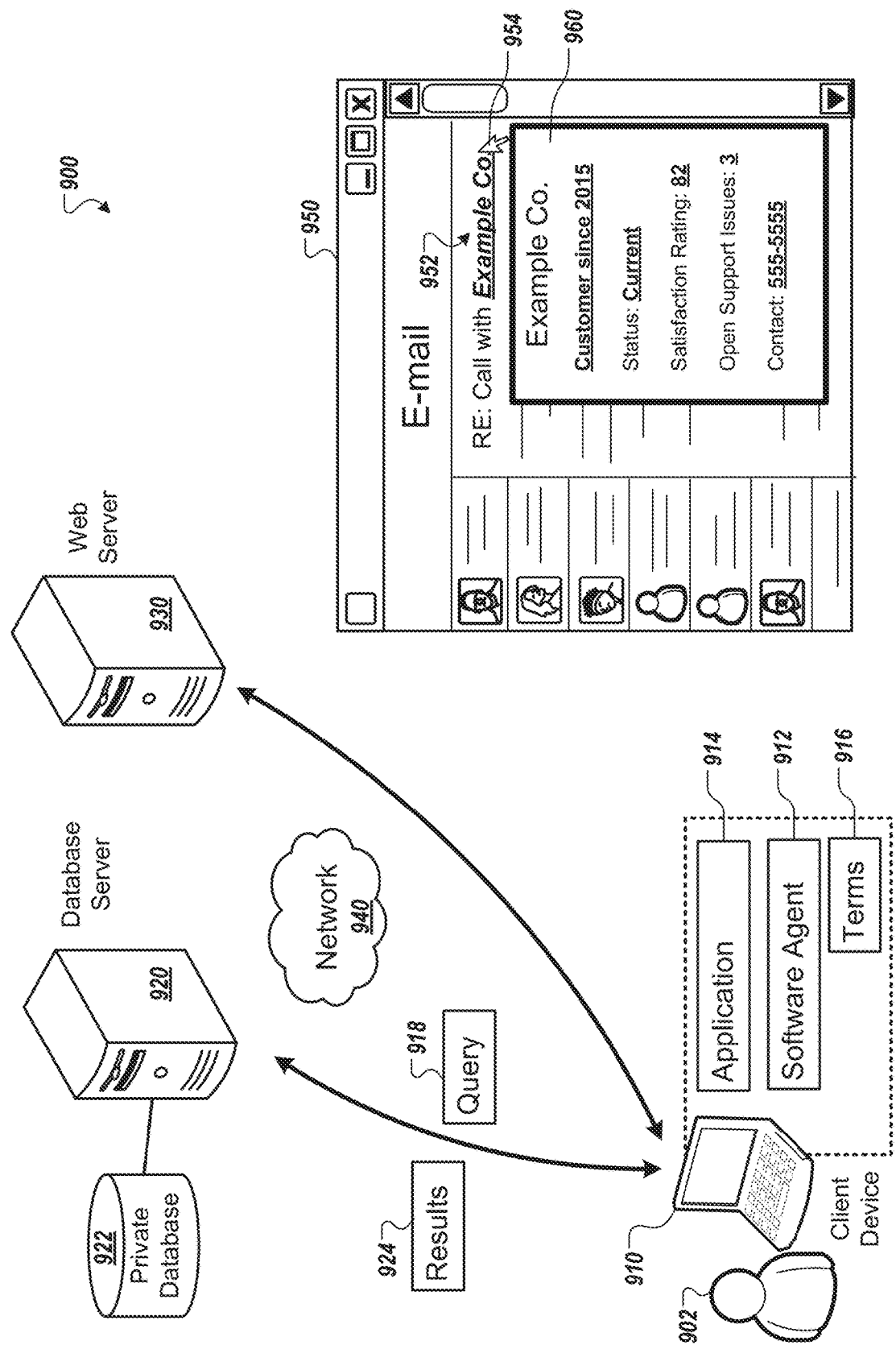
FIG. 9 is a diagram of an example of a system for inline delivery of database content.

FIG. 9 is a diagram of an example of a system 900 for inline delivery of database content. The system 900 includes a client device 910, a server 920, a web server 930, and a network 940. The server 920 has access to a private database 922 for an organization. The server 920 may be implemented using multiple computers that cooperate to perform the functions discussed below, and which may be located remotely from each other. The client device 910 includes an application 914 as well as a software agent 912 that enables the client device 910 to dynamically generate and display contextually-relevant information cards displayed inline with the application 914. As discussed below, the software agent 912 allows the client device 910 to obtain and provide information from the private database 922 with the application 914 and web page from the web server 930, even though the application 914 and web page are controlled by third parties.

The client device 910 is associated with a user 902, who is a member of an organization, e.g., an employee of a company. The private database 922 represents database records stored by or for the organization. The records are not publicly available and are subject to data access restrictions, such as requirements that users be issued credentials from the organization that grant authorization to access the records. Different users may be granted different levels of authorization, and the server 920 enforces access restrictions so that each user is only allowed to access the subsets of information the user is authorized to access.

Traditional analytics platforms generally incorporate analytics content into the body of a document, using an iFrame or similar technique. This approach can be inefficient, because each application or web page generally needs to be updated individually. Further, this type of embedding may not be possible when the content provider does not control the target application or web page for content to be embedded into. For example, an organization cannot change the standard e-mail application interface that a third party provides.

In the system 900, instead of incorporating additional content into the source of a document or application, information is instead added, just in time, through the software agent 912, for example, a browser extension for a web browser. This provides the flexibility for the system to selectively provide dynamically changing content from the private database for any interface shown on the application 914, e.g., any web application or web page displayed by a web browser.

In the example of FIG. 9, the client device 910 communicates with the web server 930 to obtain and display a page of a web site or web application in the application 914. The client device 910 generates a user interface 950 for the application 914. Concurrently, the software agent 912 runs on the client device 910 and receives, from the application 914, the text content of the rendered page, e.g., user interface 950.

The software agent 912 may require the user 902 to authenticate and thus prove authorization to receive content from the private database 922. The authentication of the user 902 can also indicate to the software agent 912 and/or server 920 the role of the user in the organization (e.g., software engineer, marketing technician, financial analyst, and so on) and the specific level of access authorization that has been granted to the user 902 by the organization.

With the user logged in, the software agent 912 accesses a set of terms 916, e.g., words and/or phrases, that are relevant to the user 902 and the organization. The set of terms stored at the client device 910. In some implementations, the set of terms 916 is requested and received from the server 920 each time the user 902 authenticates. The set of terms can represent values from certain fields of the private database 922, for example, values representing names of customers of the company of the user 902.

The software agent 912 compares the terms 916 with the text of the user interface 950 to identify matching terms. When the software agent 912 identifies one or more matches, it generates a query 918 that indicates the matches and sends the query 918 to the server 920. In some implementations, the software agent 912 also examines the text of the user interface 950 to identify and include in the query 918 other contextual factors that may be of interest (which may be different from the terms 916 of interest), such as terms indicating a time or a geographical location indicated in the user interface 950, or a task of the user 902 that may be indicated in the user interface 950. Various words and phrases indicating an overall subject or topic of the user interface 950 may also be extracted and provided in the query 918.

The server 920 processes the query 918 and generates results 924 using the contents of the private database 922. These results 924 can indicate, for each identified matching term, various indicators (e.g., attributes, statistics, visualizations, text, or other content) relevant to the term. In some instances, the indicators can represent key performance indicators for an entity referred to by an identified term with respect to the specific organization of the user 902. For example, when the term refers to a customer of a company of the user 902, one of the indicators may specify a product of the company that was purchased by the customer, current or forecasted sales of the company to the customer, etc.

The client device 910 receives the results 924 from the server 920. The software agent 912 annotates instances of the identified matching terms in the user interface and prepares the results 924 for display. For example, to annotate the matching terms, the software agent 912 may instruct the application 914 to highlight the term or otherwise change the formatting of the term (e.g., color, font, size, bold, italics, underlining, etc.) in the user interface 950. In some implementations, the results 924 are not immediately displayed. Rather, the software agent 912 causes the matching terms to become interactive, so that interaction of the user with a term triggers display of an information card for that term. In this manner, when a user indicates interest in one of the terms, e.g., by placing a mouse cursor over the term, the software agent 912 is notified of the interaction and causes an information card with the indicators relevant to the term to be displayed. The information card can be displayed overlaying a portion of the original user interface 950, for example, as a pop-up card near the instance of the term that the user interacted with. The software agent 912 also detects when the user 902 is no longer interested in the information card and automatically removes (e.g., closes or hides) the information card in response. For example, when the user moves the cursor away from the interactive term and away from the information card (or taps or clicks outside the interactive term and information card), the software agent 912 hides the information card.

In FIG. 9, the software agent 912 has determined that the user interface 950 includes a term 952 "Example Co.," which is one of the terms 916 relevant to the organization of the user 902. The software agent 912 has received results 924 that indicate indicators for this term 952, which represents a customer of the organization of the user 902. In response to identifying the matching term 952, and in some instances also receiving results 924 from the server 920 for the matching term 952, the software agent 912 makes the term 952 interactive and causes the term 952 to be annotated, in this case, displayed bold, underlined, and in italics. Initially, the software agent 912 does not cause any of the indicators for the term 952 to be displayed. However, when the user moves the cursor 954 over the term 952, the software agent 912 detects the interaction and displays an information card 960 showing various indicators provided by the server 920 in the results 924. When the user 902 is done reviewing the information card 960, the user 902 can move the cursor away or click away from the term 952 and information card 960, and the software agent 912 automatically hides the information card 960 until the user 902 again interacts with the term 952.

The software agent 912 can receive and examine the content of the user interface 950 of the application 914 on a recurring or ongoing basis. For example, as the user 902 navigates to a new web page or a new view of a web application, the software agent 912 examines the updated content of the user interface 950. The software agent 912 finds matches in the updated interface, requests and obtains new results for the updated interface, and causes new sets of terms to be annotated and made interactive, allowing the user 902 to access information cards for key terms for whatever interface content may be provided in the application 914. The software agent 912 can receive and analyze user interface content in substantially real time. For example, if the user 902 composes an e-mail message, the software agent can detect matching terms in text that the user types, in some instances while the user is still typing, and annotate matching terms in this content.

The system can provide very low latency for users to receive information regarding key terms in a user interface. Because the software agent 912 can identify terms and obtain terms automatically and in the background, in many instances the information needed for an information card 960 is already present at the client device 910 before the term is annotated. Consequently, when the user interacts with an annotated term, the corresponding information card 960 can be displayed very quickly, often within a second or less. This provides users a very fast response while also allowing access to the information from the private database 922 without having to leave the user interface 950 of the application 914.

Figure 10A:
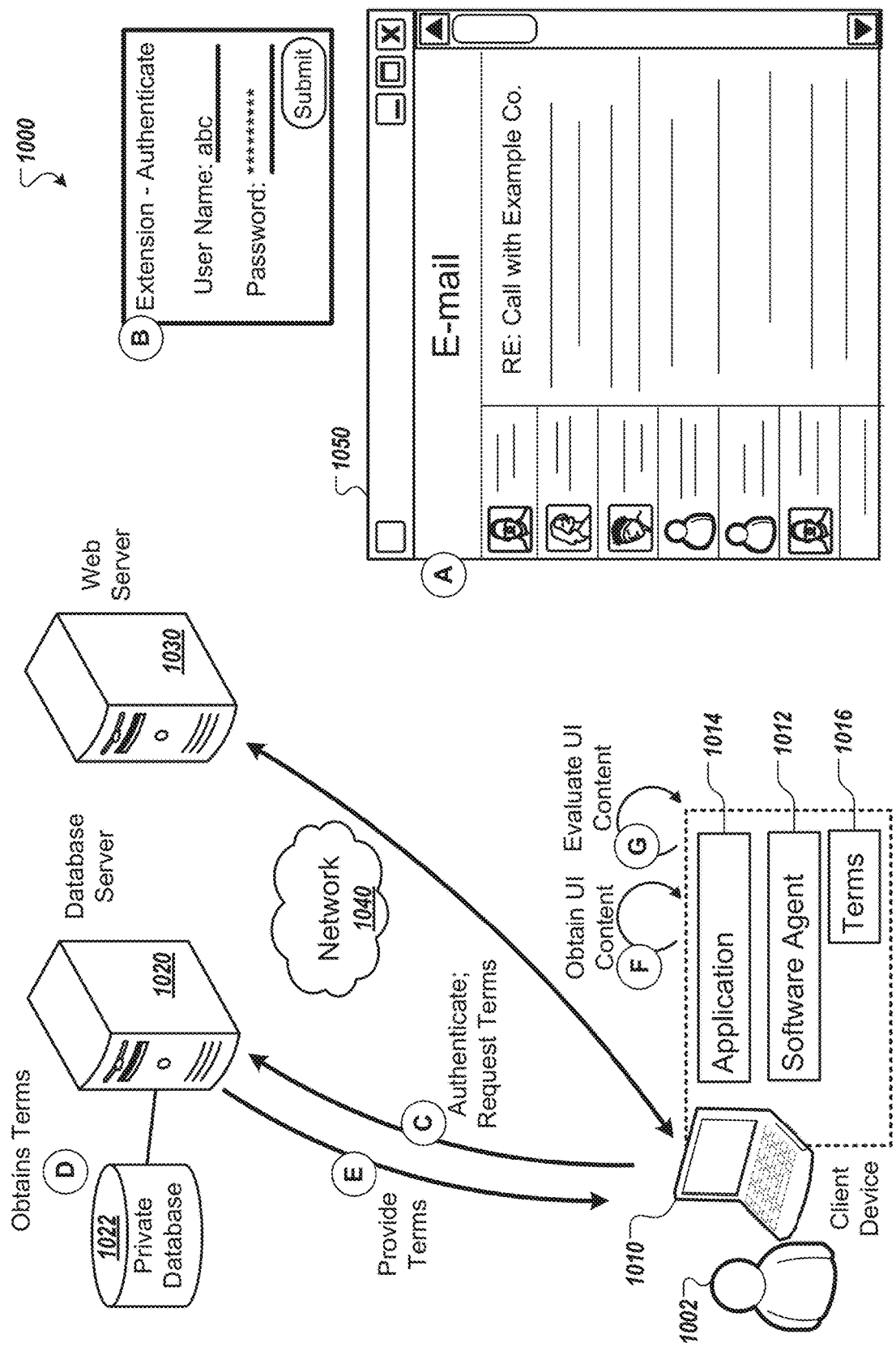
FIGS. 10A-10B are diagrams illustrating another example of a system for inline delivery of database content.
Figure 10B:
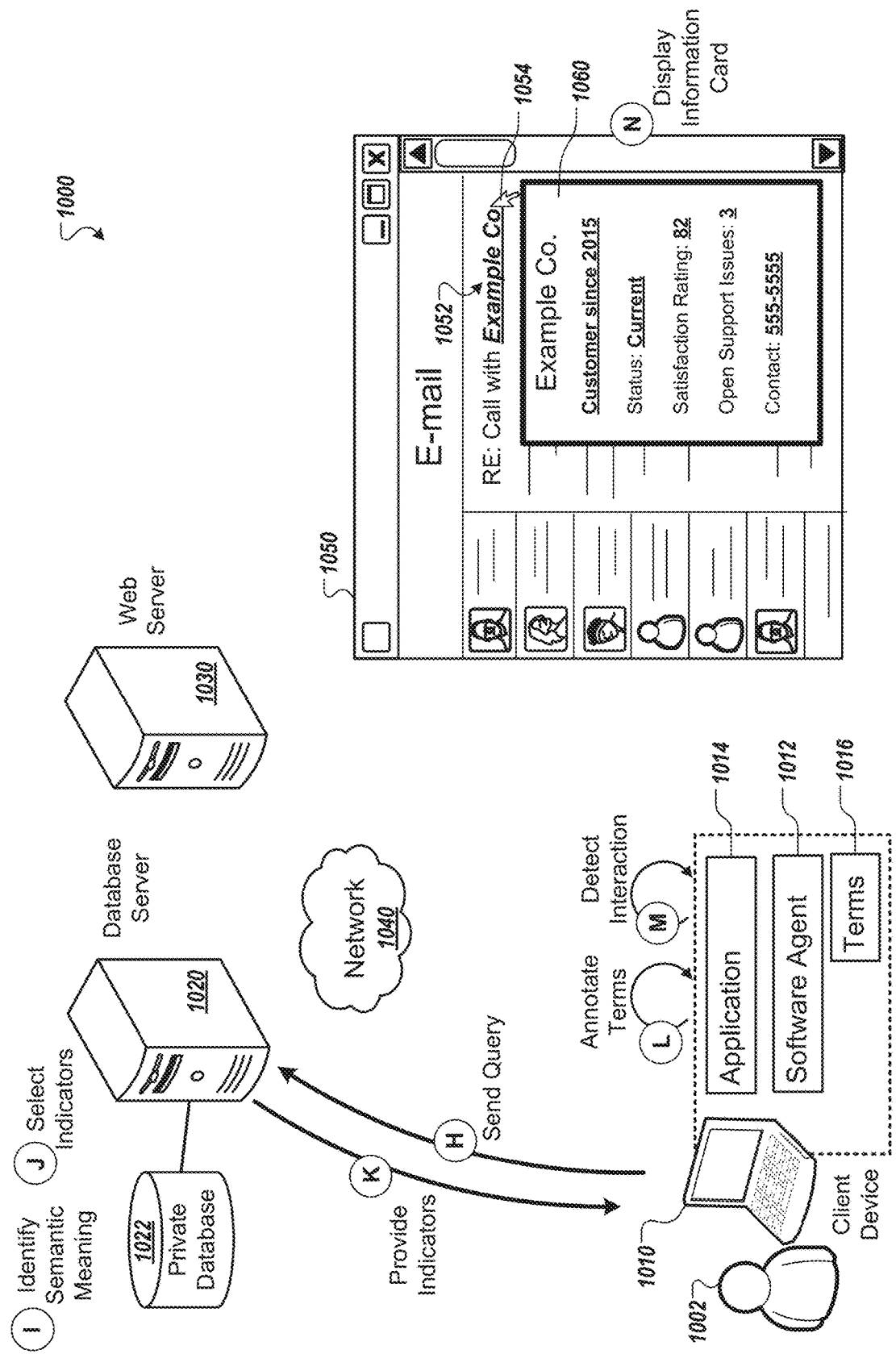

FIGS. 10A-10B are diagrams illustrating another example of a system 1000 for inline delivery of database content. FIGS. 10A-10B illustrate various operations of the system 900 in greater detail. FIGS. 10A-10B illustrate various operations and flows of data represented as stages (A)-(N), which can be performed in the order shown or in a different order.

The system 1000 includes a client device 1010, a server 1020, a web server 1030, and a network 1040. The server 1020 has access to a private database 1022 for an organization. The server 1020 may be implemented using multiple computers that cooperate to perform the functions discussed below, and which may be located remotely from each other. The client device 1010 includes an application 1014 as well as a software agent 1012 that enables the client device 1010 to dynamically generate and display contextually-relevant information cards displayed inline with the application 1014. As discussed below, the software agent 1012 allows the client device 1010 to obtain and provide information from the private database 1022 with the application 1014 and web page from the web server 1030, even though the application 1014 and web page are controlled by third parties.

In stage (A), the client device 1010 obtains and displays content from the web server 1030 in the user interface 1050.

In stage (B), the user 1002 authenticates to the software agent 1012, e.g., a web browser extension or add-on for another type of application 914. For example, the software agent 1012 may prompt the user 1002 to log in, or the user may click an icon for the software agent 1012 to initiate log in. The user can enter a username and password, or alternatively authenticate in another form, e.g., through biometric data entry, entry of a PIN code, etc.

In stage (C), the software agent 1012 communicates with the server 1020 to authenticate the user 1002. The software agent 1012 may optionally request updated information from the server 1020, such as a set of terms 1016 representing keywords relevant to the user 1002 and an organization of the user 1002.

In stage (D), the server 1020 completes the authentication of the user 1002. Once it is determined that the received credentials are valid and are authorize access to information from the private database 1022, the server 1020 obtains the current set of terms or keywords that are applicable for the user 1002 and the user's organization. This can involve extracting information from the private database 1022, for example, extracting values from certain columns or fields of the database, such as extracting values representing names of entities or objects. Terms may additionally or alternatively be extracted based on having certain metadata tags or data types associated with them. Other terms, such as abbreviations, nicknames, and other identifiers can also be included. The terms may be filtered based on the access permissions of the user 1002, the role of the user 1002 (e.g., department, job title, responsibilities, etc.), and other factors.

In stage (E), the server 1020 provides the terms to the client device 910 for storage and for use by the software agent 1012. These terms can be set by an administrator for the system 1000. In some implementations, the set of terms is generated by the server, for example, by pulling terms from a portions of a database or other data source. For example, the server 1020 may access database tables that list entity names (e.g., for competitors, suppliers, partner organization, employees, customer contacts, etc.) as well as abbreviations and/or nicknames for them. Based on the identity and role of the user 1002, the server 1020 may filter the list, e.g., limiting the extracted set of terms to those having information determined to be relevant to the role of the user 1002 and also those for which the user 1002 has security permissions to access corresponding data. The set of terms may be further limited to terms for types of entities for which appropriate information card templates have been defined. The filtered list of terms can then be provided to the client device 1010. The database may be queried dynamically each time to obtain an up-to-date set of key terms each time a new set of terms 1016 is requested.

In some implementations, the user 1002 may be able to customize the set of terms that are annotated and made interactive to be able to trigger display of an information card. For example, the software agent 1012 may provide a user interface allowing a user 1002 to edit the list of terms, e.g., to add or remove terms from the set that will be identified and annotated in the future. These changes can be customized for the specific user identity of the user 1002 who is logged in and/or for the specific client device 1010 used. The user interface may allow edits for individual terms, or for groups or categories of terms. This ability can allow a user to limit the terms that will be annotated to the set that the user is specifically interested in. Similarly, it can expand the set of terms to include terms that may not be directly related to the user's role but still relate to the user's interests.

The terms 1016 can be terms other than proper names. For example, for an engineer, the terms 1016 may additionally or alternatively may include component types, product names, or technical terms. Corresponding information cards may indicate a variety of types of information. For a component, a card might provide specifications, indicate suppliers, provide links to datasheets, identify products that use the component, etc.

In stage (F), the software agent 1012 obtains user interface content from the application 1014. For example, the software application 1012 obtains text content from the user interface 1050. This can include the entire content of the rendered page, document, or view, not only the portion that may be currently visible on screen (e.g., due to the current scrolling position).

In stage (G), the software agent 1012 evaluates content of the user interface. For example, this can include comparing text from the user interface 1050 with the terms 1016 provided by the server 1020 and stored at the client device 1010, to identify matching terms that should be annotated and for which information cards may be generated.

In some implementations, the software agent 1012 and/or the database server 1020 may analyze text of the user interface 1050 to identify or generate indicators to be displayed. Through analysis of the text of the UI, the software agent 1012 and/or the database server 1020 can, in real-time, produce indicators and other information on the fly, without the indicators being previously designed by a human author or administrator. For example, if the software agent detects there are multiple instance of an attribute combined with time and geographical dimensions, through interactions with the server 1020, the software agent can produce specific aggregations of data for the indicated time and geography and present the information in an information card. To carry out this function, the server 1020 can access a semantic graph to enable interpretation of content as it relates to a business or other entity, provide a summary, and link to more details, all of which can be produced dynamically. The semantic graph can indicate, for example, the attributes of an entity and may indicate where to locate data for the attributes from the private database 1022.

As an example, from text in a web page, the software agent 1012 may identify words in various semantic categories. As an example, along with a keyword "Example Co.," the extension may identify the terms "Q2," "Florida," "subscribers," and "2016" which are not keywords corresponding to specific entities of interest, but nonetheless have a semantic meaning identified by the software agent 1012. From these additional terms, the software agent may compose one or more indicators to be requested from the database server 1020. For example, the software agent 1012 may generate a query that requests a number of subscribers from Example Co. were added in Florida from April to June of 2016. Similarly, the software agent 1012 may generate a query requesting a total number of subscribers from the company for the same period and location. In addition, or as an alternative, the software agent 1012 may provide the terms with semantic meanings to the database server 1020, and the database server 1020 can identify appropriate indicators from the terms.

Referring to FIG. 2B, in stage (H), the software agent 1012 generates a query that indicates which terms 1016 were identified in the user interface 1050. The query can additionally include other contextual information, such as indications of time, geographical location, or topic that the software agent 1012 identified in the content from the user interface 1050. The software agent 1012 causes the client device 1010 to send the query to the server 1020.

In stage (I), the server 1020 identifies a semantic meaning for each identified term that the query indicates. As part of identifying a semantic meaning, the server 1020 may select a semantic classification from among multiple predetermined semantic categories. The semantic meaning is generated using the information of the private database 1022 and so can be specific to the user 1002 and the organization of the user. For example, one company may be a supplier for one organization and a customer of another. Similarly, even within one organization, an individual may be the supervisor of one user but a peer of or may be supervised by a different user. Thus, the interpretation of the terms can vary based on the relationships indicated in the private database 1022 and can vary from one organization to another, from one user to another, and over the course of time.

In stage (J), the server 1020 selects indicators for each identified match to the terms 1016. The server 1020 also looks up or calculates values for each type of indicator selected. These indicators or types of values to show may be any of multiple types of values. For example, some indicators may be attributes or database field values retrieved directly from a database or other data source. As another example, indicators may be results of aggregation of data from one or more databases, or may be results of processing data with equations, formulas, functions, or models.

The server 1020 may select the indicators to be provided using one or more templates that specify which indicators to use in information cards corresponding to different types of entities. For example, a template specifying a first set of indicators may be used for entities classified as suppliers, while a template specifying a different set of indicators may be used for entities classified as customers. As another example, companies, people, locations, and products may each have different templates or sets of indicators predefined, since each may have different attributes or characteristics of interest. Both of these can be used together also. For example, a first set of the indicators may be determined based one classification of an entity (e.g., person, place, object, . . . ) while a second set of the indicators may be determined based on a different classification for the entity (e.g., supplier, customer, competitor, etc.) The templates may indicate formatting and layout for information cards as well as the types of indicators that should be provided.

As noted above, for each matching term, the server 1020 determines a semantic classification of the term, e.g., a category or classification of the term and/or identifying an entity that the term refers to (e.g., where the entity may be a particular person, company, object, etc.). The server 1020 also accesses one or more records from the private database 1022. The types of records accessed may vary based on the semantic classification. For example, when the term is a customer name, the data may indicate indicating attributes of the customer (e.g., size, geographical presence, industry, etc.), financial records for the customer (e.g., products purchased, historical and predicted sales amounts, etc.), contact information for representatives of the customer, and so on. When the term is determined to refer to an employee, the accessed records may indicate the department of the employee, the responsibilities of the employee, the supervisor of the employee, the length of time the employee has been with the company, and so on.

For each semantic category, the server 1020 can have a number of potential indicators or types of data that can be provided. These indicators can take any appropriate form, such as text, numbers, icons, charts, graphs, images, etc. In some instances, the indicators can represent key performance indicators for an entity referenced by an identified term with respect to the specific organization of the user 1002. For each matching term identified in the user interface 1050, the server 1020 selects a subset of the available indicator or data types to provide in the results 1024. This subset can be selected based on various factors. In some implementations, a predefined set of indicators is pre-associated with different semantic classifications. As a result, one set of indicators is provided for customers, another set of indicators is provided for employees, another set of indicators is provided for suppliers, and so on. One way that the server 1020 can implement this is to have templates defined for each semantic classification, where the template indicates data types of indicators that are set to be provided for terms having that classification. Each indicator can have one or more references to data within the database, e.g., a column or field type of the private database 1022 used to obtain or generate the indicator, as well as corresponding equations for generating the indicator and criteria such as threshold for evaluating the indicator.

In some implementations, at least some of the indicators are selected dynamically based on analysis of the contents of the private database 1022. This process can be done to modify (e.g., filter and/or supplement) a base set of indicators pre-associated with a semantic classification or to generate the set of indicators directly. The indicators to be provided are selected from what is available or what can be calculated from the information in the private database 1022 and optionally other data sources. From the available indicators, the server 1020 can apply various thresholds to determine which indicators are most relevant. For example, if an indicator deviates from a historical average or range by more than a threshold amount, the indicator can be indicated selected. Similarly, if an indicator relates to a recent or upcoming event occurring within a threshold amount of time from the current time, the indicator can be selected. In general, each indicator can be assigned a score for each of multiple factors, the indicators can be ranked based on the scores, and the highest-scoring indicators can be selected to provide to the client device 1010 in the results 1024.

The indicators can also be customized based on the role of the user 1002 in the organization. For example, the server 1020 can look up a job title, department identifier, or other classification of the user 1002, and also access data specifying indicators relevant to that classification. As an example, a user indicated in company records as a financial analysis may be provided financial metrics for a customer, while a user indicated as an engineer may be provided technical information about a product sold to the customer. The indicators selected can be further customized based on the historical interaction of the user 1002. For example, based on records of interactions of the user 1002 with prior information cards, the server 1020 can determine which indicators are likely to be of interest to the user 1002 for different types of entities.

The server 1020 may use various other techniques to select indicators, including predefined indicators for specific classifications or specific entities, user interactions data for multiple users, user preferences of the user 1002, prior behavior of the user 1002, artificial intelligence or machine learning, analysis of trends, news and recent events, and so on.

In some implementations, the system tracks user interactions and learns from user behavior. For example, the system can monitor interactions with information cards and adapt the current information card or later-provided information cards in response. The system can track any of a variety of interaction parameters, such as how long an information card is displayed, how many times the information card is caused to be displayed, whether a user moves a cursor over a UI element (e.g., a mouseover), how long the cursor hovers over the UI element, whether a UI element is selected or copied to a clipboard, etc. Information cards can have interactive elements also, e.g., buttons, scrolling controls, drop-down lists, hyperlinks, sliders, dials, maps, embedded audio or video, and so on. These interactive elements may reveal additional indicators or allow a user to access additional content from the private database or other data sources. The system can track interactions with these interactive elements as well.

The system can customize the characteristics of information cards for users individually or based on aggregated information about interactions of multiple users. For example, according to the level of interaction that users have with indicators on the cards, the system can change which types of indicators are selected, as well as the prominence, arrangement, or number of indicators presented. If one user frequently hovers over, selects, or copies to a clipboard information from a certain type of indicator for entities of a certain classification, the system may generate future cards for that classification to show the indicator more prominently (e.g. larger or closer to the top of the card) and/or to include additional related indicators (e.g., showing the indicator with greater precision, or showing trends in the indicator over time, or showing other indicators of the same data type). As another example, if a user rarely interacts with certain types of indicators, those indicators may be made less prominent (e.g., smaller or lower in the card) or may be removed.

Tracking and adjustment of information cards can be done on a per-user basis, or for groups of users (e.g., users at similar roles or in the same department or organization), or across users generally. Similarly, tracking and adjustment can be done for certain classifications as a whole (e.g., across all entities or terms sharing a semantic classification), or tracking and adjustment may be done separately at the level of individual terms or entities. For example, two companies of the same semantic classification (e.g., both suppliers to an organization) may have different indicators shown in their information cards, or have a different arrangement of the indicators, due to different ways users interact with the respective cards.

The server 1020 may apply security policies when selecting which types of indicators to use and when generating or providing values for the indicators to the client device 1010. For example, security policies may limit access to certain databases or portions of databases, and the server 1020 may determine whether the user 1002 has sufficient access privileges before providing (or even simply retrieving or computing) values for that depend on data that the user 1002 is not authorized to access. In some implementations, database information may secure information at the level of a table, column, and/or row. As a result, collections of records, individual records, or even individual fields or elements of records may have security policies applied. If the server 1020 determines that the value of an indicator would depend on data that the user 1002 is not authorized to access, the server 1020 does not provide the indicator value. Instead, the server 1020 may omit that indicator, substitute the indicator for one that the user 1002 is authorized to obtain, or cause a placeholder value such as "n/a" or "—" to be provided to indicate that the value is not being provided.

In some implementations, the server 1020 maintains associations or links between terms and different data records or data sources. For example, the server 1020 may store data mapping terms to data cubes used for online analytical processing (OLAP). Selecting the types of indicators and determining the values for those indicators can involve using the mapping data to retrieve data from the data cubes (or other forms of data storage). Other mappings may also be used. For example, different terms may mapped to a unique identifier, which is then mapped to other records. For example, the terms "Example Company," "Example Co.," "EC," and other related terms may each map to a single entity identifier, which may then be used to retrieve information about the which indicators are relevant and what the values for those indicators should be.

In stage (K), the server 1020 provides the values for the selected indicators for each identified term from the query to the client device 1010. In the example, the selected indicators include a status of the "Example Co." company with respect to the organization of the user 1002, a satisfaction rating indicating how satisfied the company appears to be as a client, a number of open support issues for "Example Co." and contact information for "Example Co." The server provides an indication of each of these indicator types, as well as a value corresponding to each indicator, e.g., a value of "current" for the status indicator, a value of "82" for the satisfaction rating indicator, a value of "3" for the number of support issues, and the phone number "555-5555" for the contact information indicator.

In stage (L), the software agent 1012 cooperates with the application 1014 to annotate the identified terms in the user interface 1050. For example, the term 1052 is annotated in FIG. 2B. This process causes the annotated terms to become interactive. For example, the software agent 1012 can register with the application 1014 to receive notification of interaction events, such as a mouseover event, click event, tap event, etc.

In some implementations, when the application 1014 is a web browser, the software agent 1012 can inject code, such as HTML code and/or JavaScript code, into the content of a web page being browsed to cause annotations to be shown. The injected code may also listen for and respond to events, such as a click, mouseover, tap, or other interaction with annotated terms. When the application 1014 is not a web browser, the software agent 1012 may use other techniques, such as macros or APIs to cause terms to be annotated and become interactive. In a similar manner that a web browser accepts toolbars and extension modules, the application 1014 may provide extension components to integrate with other types of applications as well. More generally, the software agent may provide overlay content to be placed on, around, or over the place where the term occurs. This may optionally be done through communication with the operating system rather than integration with a specific application.

In stage (M), the software agent 1012 detects interaction with one of the annotated terms. For example, the user 1002 moves a cursor 1054 over the annotated term 1052. The software agent 1012 may detect the interaction by being notified by code that was injected into a web page, such as event handling code that notifies the software agent 1012 of the user action. Other techniques may additionally or alternatively be used. For example, the software agent 1012 may monitor user input events generally, with information provided by the operating system, for example. The software agent 1012 may track the on-screen position of each annotated term, as well as the position of a cursor or user input, and thus detect when the user has interacted with one of the annotated terms.

In stage (N), the software agent 1012 causes the display of an information card 1060, for example, as an overlay or pop-up over the original user interface 1050. The information card can include the indicators selected by the server 1020 and provided over the network. In some implementations, the information card 1060 can be displayed near, e.g., adjacent to or even partially or completely overlapping the annotated term 1052.

While various examples discuss annotating terms shown in a web page, the same techniques can be used to annotate and make interactive terms occurring anywhere in a user interface. Thus, terms in applications, documents, toolbars, controls, or any other part of a user interface can be annotated and made interactive to trigger display of an information card corresponding to the term.

As discussed above, the application can be a web browser, and the software agent can be a web browser extension. Nevertheless, the same techniques can be used to provide information cards for other types of applications and with other types of software agents. For example, a native application for word processing, spreadsheet editing, presentation editing, document viewing, etc. can provide an application programming interface (API) through which the content of the application can be provided to a software agent implemented as an application add-on module or extension. The software agent can integrate with or operate alongside a native application to identify keywords and dynamically display information cards as discussed herein.

Figure 11:
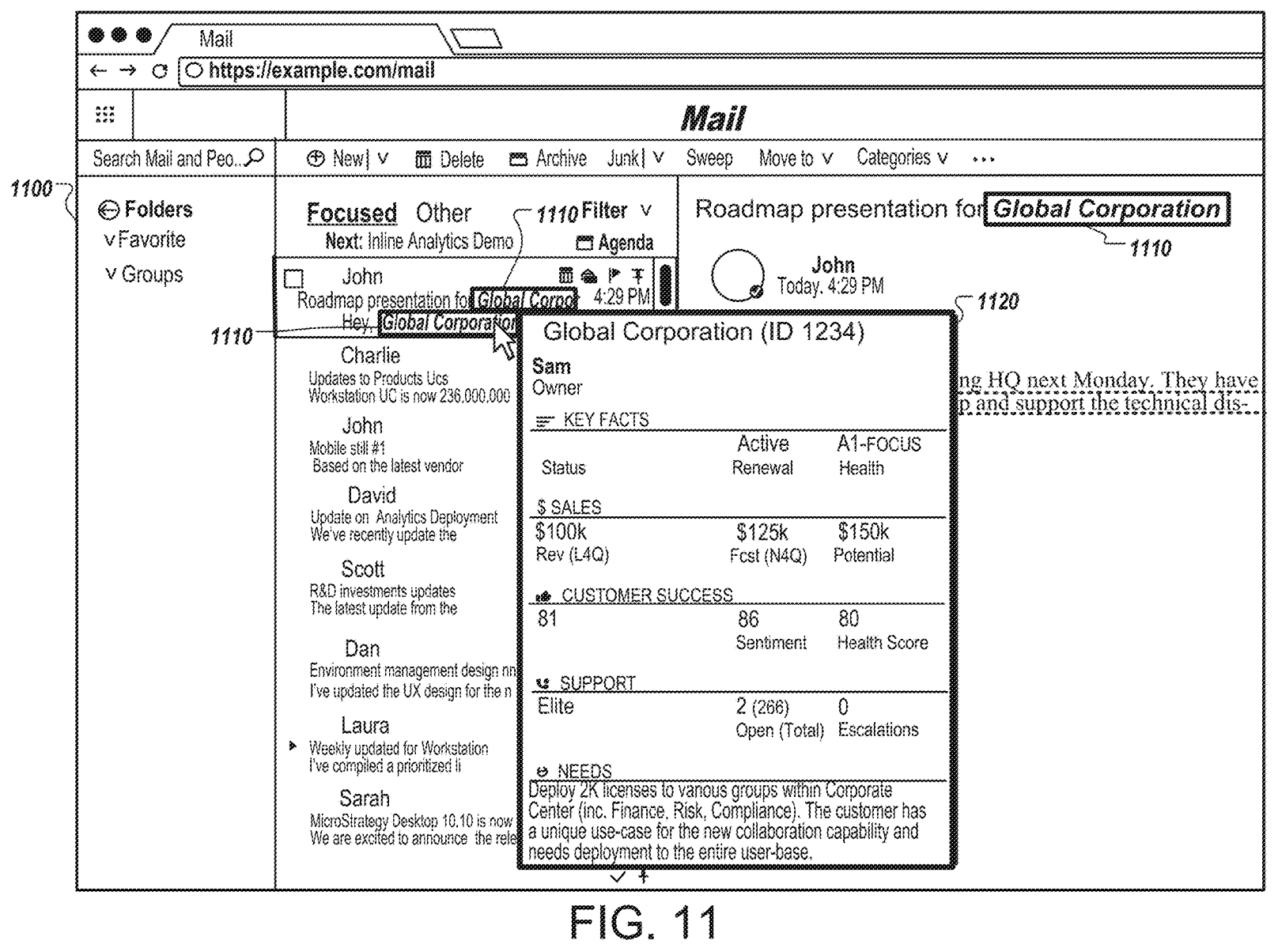

FIG. 11 is a diagram illustrating an example of a user interface 1100 showing an information card provided in response to user interaction. In the example, the user interface 1100 is one that may be provided by a client device, such as devices 910, 1010 above. The particular example illustrated shows a web browser and a web page providing information from a user's e-mail account. Upon navigating to the web page, the client device obtains the text content to be displayed, e.g., content of the web page, and checks the text content for matches with a set of key terms, e.g., words or phrases indicated by a server system or stored at the client device. As discussed above each of the key terms has corresponding information in a database. A key term may refer to a particular entity, and the entity can have a particular information card template associated with it.

In FIG. 11, after navigating to the web page shown in the user interface 1100, the system has determined that the phrase "Global Corporation" is matches an entry in a list of key phrases. In response, the client device annotates each instance 1110 of this term in the user interface 1100, shown here by bold and italic formatting and a box around the term. Other types of annotations can be additionally or alternatively used. Each instance of the key term is also made interactive.

When the user interacts with an instance 1110 of the key term, the client device generates and provides an information card 1120 corresponding to an entity represented by the term. As illustrated, the interaction can be a mouse-over event where a cursor rests on or near the annotated term for at least a minimum amount of time. This interaction can trigger the client device to request an information card from a server system. The information card can include any of various types of information relating to the entity indicated by the key term, such as values from a database, statistics, visualizations, links to further information, quantitative or qualitative ratings related to the entity, and so on.

In some implementations, to allow the client device to obtain the data for the information card, the server system (1) maps an identified key term indicated by the client device to a specific entity, (2) selects an information card template corresponding to the specific entity or a type or classification of that entity, and (3) retrieves information from a database relating to the specific entity, according to the types of information specified by the selected information card template. The server system can then send the data for the information card to the client device for display. In some implementations, this process is done in substantially real time. For example, the server system can be tuned and can cache information about various entities so that the client device can obtain and display an information card less than a threshold amount of time after detecting the user interaction (e.g., 3 seconds, 1 second, 0.5 seconds, etc.).

A number of implementations have been described. Nevertheless, it will be understood that various modifications may be made without departing from the spirit and scope of the disclosure. For example, various forms of the flows shown above may be used, with steps re-ordered, added, or removed.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method performed by a computing device, the method comprising:
   receiving, by the computing device, keyword data from a server system over a communication network, the keyword data indicating a set of terms determined based at least in part on an identity of a user of the computing device or an organization associated with the user;
   analyzing, by the computing device, text of a user interface of the computing device;
   based on the analysis of the text of the user interface, determining, by the computing device, that the text of a user interface of the computing device includes a keyword indicated in the keyword data;
   based on determining that the text of the user interface of the computing device includes the keyword, adjusting, by the computing device, the user interface to make the keyword interactive and to annotate the keyword in a manner that distinguishes the keyword from other text in the user interface;

after adjusting the user interface, detecting, by the computing device, user interaction with the keyword in the user interface; and in response to detecting the user interaction with the keyword, displaying, by the computing device, a card having content determined based on the keyword.

2. The method of claim 1, wherein the text of the user interface is text of a web page or web application presented in a web browser;

wherein adjusting the user interface comprises causing the web browser to adjust presentation of the web page or web application to annotate the keyword in the presented web page or web application; and wherein detecting the user interaction with the keyword comprises receiving event data from the web browser, the event data indicating the user interaction with the annotated keyword in the text of the web page or web application.

3. The method of claim 1, wherein the card is an information card having values populated into a card template selected based on the keyword.

4. The method of claim 1, further comprising:
identifying an entity based on the keyword; and
obtaining information about the entity from a database;
wherein the content of the card comprises the information about the entity obtained from the database.

5. The method of claim 1, wherein the content of the card is obtained from a private database for the organization associated with the user.

6. The method of claim 1, wherein the content of the card is selected based on one or more other terms in the user interface other than the keyword.

7. The method of claim 1, wherein the content of the card is further determined based on an indication in the user interface of a geographical location, a time, a person, or information relevant to a current task of a user of the computing devices.

8. The method of claim 1, wherein the content of the card is determined based on the identity of a user or a role of the user in an organization.

9. The method of claim 1, further comprising:
before detecting user interaction with the keyword in the user interface:
in response to determining that the text of a user interface includes the keyword indicated in the keyword data, sending a request to a server system that indicates the keyword; and
receiving a response from the server system over the communication network, wherein the network comprises the content for the card; and
wherein displaying the card comprises displaying the card to include the content received from the server system before detecting the user interaction with the keyword in the user interface.

10. A computing device comprising:
one or more processors; and
one or more machine-readable media storing instructions that are operable, when executed by the one or more processors, to cause the computing device to perform operations comprising:
receiving, by the computing device, keyword data from a server system over a communication network, the keyword data indicating a set of terms determined based at least in part on an identity of a user of the computing device or an organization associated with the user;

analyzing, by the computing device, text of a user interface of the computing device;

based on the analysis of the text of the user interface, determining, by the computing device, that the text of a user interface of the computing device includes a keyword indicated in the keyword data;

based on determining that the text of the user interface of the computing device includes the keyword, adjusting, by the computing device, the user interface to make the keyword interactive and to annotate the keyword in a manner that distinguishes the keyword from other text in the user interface;

after adjusting the user interface, detecting, by the computing device, user interaction with the keyword in the user interface; and in response to detecting the user interaction with the keyword, displaying, by the computing device, a card having content determined based on the keyword.

11. The computing device of claim 10, wherein the text of the user interface is text of a web page or web application presented in a web browser;

wherein adjusting the user interface comprises causing the web browser to adjust presentation of the web page or web application to annotate the keyword in the presented web page or web application; and wherein detecting the user interaction with the keyword comprises receiving event data from the web browser, the event data indicating the user interaction with the annotated keyword in the text of the web page or web application.

12. The computing device of claim 10, wherein the card is an information card having values populated into a card template selected based on the keyword.

13. The computing device of claim 10, wherein the operations further comprise:
identifying an entity based on the keyword; and
obtaining information about the entity from a database;
wherein the content of the displayed card comprises the information about the entity obtained from the database.

14. The computing device of claim 10, wherein the content of the displayed card is obtained from a private database for the organization associated with the user.

15. The computing device of claim 10, wherein the content of the card is selected based on one or more other terms in the user interface other than the keyword.

16. One or more non-transitory machine-readable media storing instructions that are operable, when executed by one or more processors of a computing device, to cause the computing device to perform operations comprising:
receiving, by the computing device, keyword data from a server system over a communication network, the keyword data indicating a set of terms determined based at least in part on an identity of a user of the computing device or an organization associated with the user;

analyzing, by the computing device, text of a user interface of the computing device;

based on the analysis of the text of the user interface, determining, by the computing device, that the text of a user interface of the computing device includes a keyword indicated in the keyword data;

based on determining that the text of the user interface of the computing device includes the keyword, adjusting, by the computing device, the user interface to make the keyword interactive and to annotate the keyword in a manner that distinguishes the keyword from other text in the user interface;

after adjusting the user interface, detecting, by the computing device, user interaction with the keyword in the user interface; and in response to detecting the user interaction with the keyword, displaying, by the computing device, a card having content determined based on the keyword.

17. The one or more non-transitory machine-readable media of claim 16, wherein the text of the user interface is text of a web page or web application presented in a web browser;

wherein adjusting the user interface comprises causing the web browser to adjust presentation of the web page or web application to annotate the keyword in the presented web page or web application; and wherein detecting the user interaction with the keyword comprises receiving event data from the web browser, the event data indicating the user interaction with the annotated keyword in the text of the web page or web application.

18. The one or more non-transitory machine-readable media of claim 16, wherein the card is an information card having values populated into a card template selected based on the keyword.

19. The one or more non-transitory machine-readable media of claim 16, wherein the operations further comprise:

identifying an entity based on the keyword; and obtaining information about the entity from a database;

wherein the content of the displayed card comprises the information about the entity obtained from the database.

20. The one or more non-transitory machine-readable media of claim 16, wherein the content of the displayed card is obtained from a private database for the organization associated with the user.

* * * * *